(12) United States Patent
Won et al.

(10) Patent No.: US 11,513,758 B2
(45) Date of Patent: Nov. 29, 2022

(54) DISPLAY DEVICE HAVING VIBRATION GENERATOR AND MAGNETS

(71) Applicant: Samsung Display Co., Ltd., Yongin-si (KR)

(72) Inventors: Byeong Hee Won, Incheon (KR); Eun Kyung Yeon, Suwon-si (KR); Jae Been Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 242 days.

(21) Appl. No.: 16/888,866

(22) Filed: Jun. 1, 2020

(65) Prior Publication Data

US 2020/0387337 A1 Dec. 10, 2020

(30) Foreign Application Priority Data

Jun. 7, 2019 (KR) .................. 10-2019-0067444

(51) Int. Cl.
*G06F 3/16* (2006.01)
*G06F 1/16* (2006.01)
*G10K 9/13* (2006.01)

(52) U.S. Cl.
CPC .............. *G06F 3/16* (2013.01); *G06F 1/1605* (2013.01); *G10K 9/13* (2013.01)

(58) Field of Classification Search
CPC ... H04R 1/00; H04R 1/02; H04R 1/10; H04R 1/26; H04R 1/28; H04R 1/32; H04R 5/02; H04R 7/04; H04R 9/02; H04R 9/06; H04R 11/02; H04R 13/00; H04R 23/02; H04R 25/00; G06F 1/16; G06F 1/18; G06F 1/1605; G06F 3/01; G06F 3/041; G06F 3/043; G06F 3/045; G06F 3/16; G10K 9/13; H01F 7/00; H01F 7/06; H02N 2/00; G02F 1/1333; G02F 1/1362
See application file for complete search history.

(56) References Cited

U.S. PATENT DOCUMENTS

| | | |
|---|---|---|
| 4,242,541 A | 12/1980 | Ando |
| 2002/0021821 A1 | 2/2002 | Tanase et al. |
| 2018/0109893 A1* | 4/2018 | Chu .......................... H04R 7/16 |
| 2018/0269808 A1 | 9/2018 | Park et al. |
| 2019/0339776 A1* | 11/2019 | Rosenberg ............. G06F 3/045 |
| 2021/0195338 A1* | 6/2021 | Soronen ................. H04R 11/02 |
| 2022/0006478 A1* | 1/2022 | Yu ........................... H04M 1/03 |

FOREIGN PATENT DOCUMENTS

KR 10-2018-0106473 10/2018

* cited by examiner

*Primary Examiner* — Chanh D Nguyen
*Assistant Examiner* — Nguyen H Truong
(74) *Attorney, Agent, or Firm* — H.C. Park & Associates, PLC

(57) ABSTRACT

A display device, includes: a display panel including a pixel array layer, a panel lower member disposed under the display panel, a first magnet disposed under the panel lower member and having a first area, a vibration generator coupled to one surface of the first magnet and having a second area larger than the first area; and a second magnet overlapping the first magnet in a thickness direction and spaced apart from the first magnet in the thickness direction.

27 Claims, 40 Drawing Sheets

510: CAP1, CAP2, FP

FIG. 13
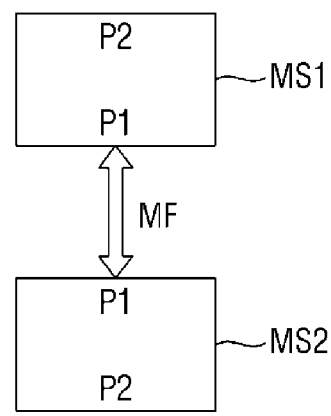
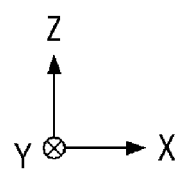

DISPLAY DEVICE HAVING VIBRATION GENERATOR AND MAGNETS

CROSS REFERENCE TO RELATED APPLICATION

This application claims priority from and the benefit of Korean Patent Application No. 10-2019-0067444, filed on Jun. 7, 2019, which is hereby incorporated by reference for all purposes as if fully set forth herein.

BACKGROUND

Field

Exemplary implementations of the invention relate generally to a display device for outputting sound.

Discussion of the Background

With some informational devices, requirements have increased for display devices to display images in various forms. For example, display devices can be applied to various electronic appliances such as smart phones, digital cameras, notebook computers, navigators, and smart televisions. A display device may include a display panel for displaying an image and a sound generator for providing a sound.

As applicable to various electronic appliances, display devices require varied designs. For example, a display device of a smart phone may be required to have the capability of increasing a display area by omitting a sound generator located at the front surface of the display device to output a voice of a counterpart.

The above information disclosed in this section is only for understanding the background of the inventive concepts, and, therefore, may contain information that does not form prior art.

SUMMARY

Some aspects of the exemplary embodiments provide a display device capable of outputting a sound using a magnet and a vibration generator that may not be externally exposed, and various arrangements are disclosed herein.

Additional aspects will be set forth in the detailed description which follows, and, in part, will be apparent from the disclosure, or may be learned by practice of the inventive concepts.

According to some exemplary embodiments, a display device, includes: a display panel including a pixel array layer, a panel lower member disposed under the display panel, a first magnet disposed under the panel lower member and having a first area, a vibration generator coupled to one surface of the first magnet and having a second area larger than the first area; and a second magnet overlapping the first magnet in a thickness direction and spaced apart from the first magnet in the thickness direction.

According to some exemplary embodiments, a display device, includes: a display panel including a pixel array layer; a panel lower member disposed under the display panel; a magnet disposed under the panel lower member and having a first area; and a vibration generator coupled to one surface of the magnet and having a second area larger than the first area, wherein the vibration generator comprises a magnetic layer including a planar coil portion and polarity switchable with an applied current, and a vibration generating layer disposed between the magnetic layer and the magnet.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts

FIG. 13 is a view of magnets according to some exemplary embodiments.

DETAILED DESCRIPTION OF THE ILLUSTRATED EMBODIMENTS

Figure 1:
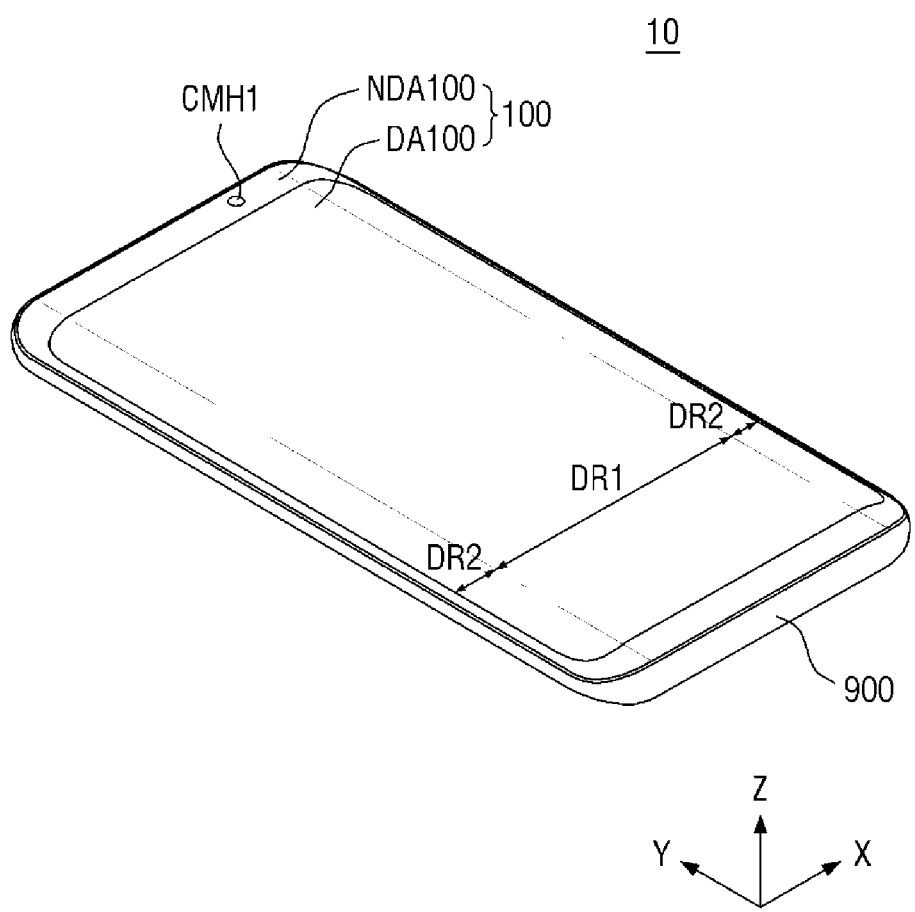
FIG. 1 is a perspective view of a display device according to some exemplary embodiments.

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the X-axis, the Y-axis, and the Z-axis are not limited to three axes of a rectangular coordinate system, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "bottom," "under," "lower," "lower side," "lower surface," "above," "upper," "on," "over," "top," "higher," "upper side," "upper surface," "side" (e.g., as in "sidewall"), "left," "right," "upper," and "lower," and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly. Generally, in this specification, the "on", "over", "top", "upper side", or "upper surface" refers to a direction in which the cover window 100 is disposed, that is, a Z-axis direction, with respect to the display panel 300, and the "beneath", "under", "bottom", "lower side", or "lower surface" refers to a direction in which the middle is frame 600 is disposed, that is, a direction opposite to the Z-axis direction, with respect to the display panel 300. Further, the "left", "right", "upper", and "lower" refer to directions when the display panel 300 is viewed from the plane. For example, the "left" refers to a direction opposite to the X-axis direction, the "right" refers to the X-axis direction, the "upper" refers to the Y-axis direction, and the "lower" refers to a direction opposite to the Y-axis direction.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Figure 2:
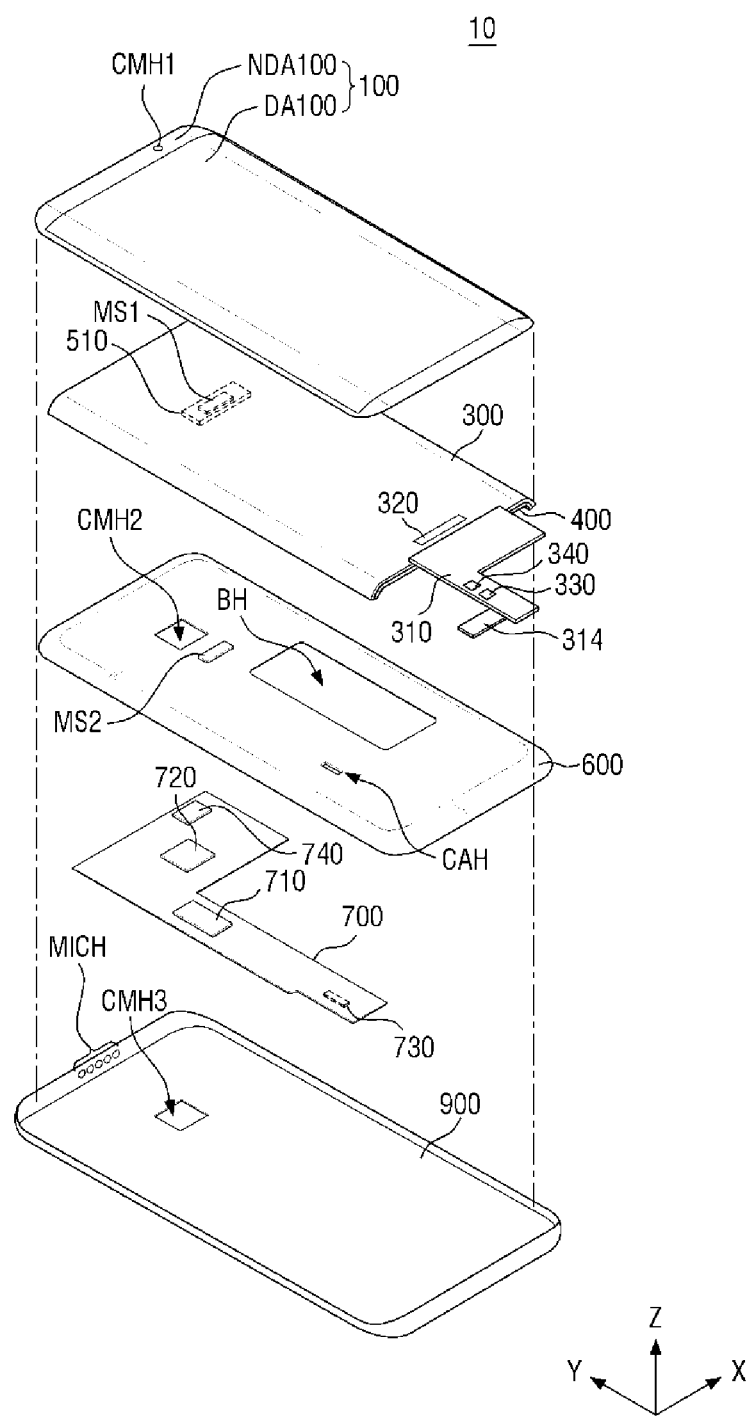
FIG. 2 is an exploded perspective view of a display device according to some exemplary embodiments.

Hereinafter, various exemplary embodiments will be explained in detail with reference to the accompanying drawings. FIG. 1 is a perspective view of a display device according to some exemplary embodiments. FIG. 2 is an exploded perspective view of a display device according to some exemplary embodiments.

Referring to FIGS. 1 and 2, a display device 10 in some exemplary embodiments can include a cover window 100, a display panel 300, a display circuit board 310, a display driving circuit 320, a panel lower cover or panel lower member 400, a vibration generator 510, a middle frame 600, a main circuit board 700, and a lower cover 900.

The display device 10 may have a rectangular (or generally rectangular) shape in a plan view. For example, as shown in FIGS. 1 and 2, the display device 10 may have a rectangular planar shape having short sides in the first direction (X-axis direction) and long sides in the second direction (Y-axis direction). The edge where the short side in the first direction (X-axis direction) meets the long side in the second direction (Y-axis direction) may be formed to have a round (or generally round) shape of a predetermined curvature (or general curvature) or have a right angle (or generally right angle) shape. The planar shape of the display device 10 is not limited to a rectangular shape, and may be formed in another polygonal (or generally polygonal) shape, circular (or generally circular) shape, or elliptical (or generally elliptical) shape.

The display device 10 may include a first area DR1 formed flat and a second area DR2 extending from the right and left sides of the first area DR1. The second area DR2 may be formed to be flat or curved. When the second area DR2 is formed to be flat, the angle formed by the first area DR1 and the second area DR2 may be an obtuse angle. When the second area DR2 is formed to be curved, the second area DR2 may have a constant curvature or a variable curvature.

Although it is shown in FIG. 1 that the second area DR2 may extend from the left and right sides of the first area DR1, some exemplary embodiments are not limited thereto. For instance, the second area DR2 may extend from only one of the left and right sides of the first area DR1. In addition, the second area DR2 may extend from only one of the upper and lower sides of the first area DR1 as well as only one of the left and right sides of the first area DR1. Hereinafter, the second area DR2 may be disposed along the left and right edges of the display device 10.

The cover window 100 may be disposed on the display panel 300 so as to cover the upper surface of the display panel 300. Thus, the cover window 100 may function to protect the upper surface of the display panel 300.

The cover window 100 may include a light transmitting area DA100 corresponding to the display panel 300 and a light blocking area NDA100 corresponding to an area other than the display panel 300. The cover window 100 may be disposed in the first area DR1 and the second area DR2, and the light transmitting area DA100 may be disposed in a part of the first area DR1 and a part of the second area DR2. The light blocking area NDA100 may be formed to be opaque. Or, the light blocking area NDA100 may be formed as a decorative layer having a pattern that can be seen to a user when an image is not displayed. For example, a company logo or various characters may be patterned on the light blocking area NDA100. Further, the light blocking area NDA100 may be provided with a first camera hole CMH1 for exposing a front camera 740, but some exemplary embodiments are not limited thereto. For example, the first camera hole CMH1 may also be formed in the light transmitting area DA100, not in the light blocking area NDA100. For instance, the display panel 300 may include a through-hole for exposing the front camera 740.

The display panel 300 may be disposed under the cover window 100. The display panel 300 may be disposed to overlap the light transmitting area DA100 of the cover window 100. The display panel 300 may be disposed in the first area DR1 and the second areas DR2. Thus, the image of the display panel 300 may be seen not only in the first area DR1 but also in the second areas DR2.

The display panel 300 may be a light emitting display panel including a light emitting element. Examples of the display panel 300 may include an organic light emitting display panel using an organic light emitting diode including an organic light emitting layer, an ultra-micro light emitting diode display panel using an ultra-micro light emitting diode (ultra-micro LED, a quantum dot light emitting diode display panel using a quantum dot light emitting diode including a quantum dot light emitting layer, and an inorganic light emitting display panel using an inorganic light emitting diode including an inorganic semiconductor. Hereinafter, it is assumed that the display panel 300 is an organic light emitting display panel.

The display circuit board 310 and the display driving circuit 320 may be attached to one side of the display panel 300. One end of the display circuit board 310 may be attached onto pads provided on one side of the display panel 300 using an anisotropic conductive film. The display circuit board 310 may be a flexible printed circuit board.

The display driving circuit 320 may receive control signals and power supply voltages through the display circuit board 310, generate, and output signals and voltages for driving the display panel 300. The display driving circuit 320 may be formed as an integrated circuit and may be attached onto the protruding area PA of the display panel 300 using a chip on glass (COG) manner, a chip on plastic (COP) manner, or an ultrasonic manner, but exemplary embodiments are not limited thereto. For example, the display driving circuit 320 may be attached onto the display circuit board 310.

A touch driving circuit 330 may be disposed on the display circuit board 310. The touch driving circuit 330 may be formed as an integrated circuit and may be attached to the upper surface of the display circuit board 310. The touch driving circuit 330 may be connected to the touch electrodes and touch lines of a touch sensor layer of the display panel 300 through the display circuit board 310. The touch driving circuit 330 may apply touch driving signals to driving electrodes among the touch electrodes in a mutual capacitance manner, and may sense the charge variations of capacitances between the driving electrodes and the sensing electrodes through the sensing electrodes among the touch electrodes, thereby sensing a touch.

A vibration driving circuit 340 may be disposed on the display circuit board 310. The vibration driving circuit 340 can receive vibration data from a main processor 710. The vibration driving circuit 340 can generate a first-A driving voltage and a first-B driving voltage according to the first vibration data and outputs the first-A driving voltage and the first-B driving voltage to the vibration generator 510. The vibration generator 510 may be vibrated according to the first-A driving voltage and the first-B driving voltage, and may vibrate the display panel 300 to output a sound.

The vibration driving circuit 340 may include a digital signal processor (DSP) for processing the vibration data which may be digital signals, a digital-to-analog converter (DAC) for converting the vibration data processed from the digital signal processor (DSP) into driving voltages which may be analog signals, and an amplifier (AMP) for amplifying and outputting the driving voltages.

The panel lower member 400 may be disposed under the display panel 300. The panel lower member 400 may be attached to the lower surface of the display panel 300 via an adhesive member.

The middle frame 600 may be disposed under the panel lower member 400. The middle frame 600 may include plastic, metal, or both plastic and metal.

The middle frame 600 may be provided with a second camera hole CMH2 into which a camera device 720 is inserted, a battery hole BH in which a battery may be disposed, and a cable hole CAH through which a cable 314 may be connected to the display circuit board 310 passes.

Magnets MS1 and MS2 and the vibration generator 510 may be disposed between the panel lower member 400 and the middle frame 600. The magnets MS1 and MS2 can refer to bodies having a magnetic field. Illustratively, the magnets MS1 and MS2 may be bodies continuously having a magnetic field, and may also be bodies instantaneously having a magnetic field according to the flow of current. The vibration generator 510 may be a piezoelectric element or piezoelectric actuator that can vibrate the display panel 300 using a piezoelectric material contracting and expanding according to the applied voltage.

Although it is illustrated in FIG. 2 that the magnets MS1 and MS2 and the vibration generator 510 may be located close to the upper side of the display panel 300, the locations of the magnets MS1 and MS2 and the vibration generator 510 are not limited thereto. The magnets MS1 and MS2 and the vibration generator 510 may be disposed in an area where there is no or substantially no mechanical interference with the display circuit board 310 and the battery hole BH and second camera hole CMH2 may be formed in the middle frame 600. For instance, the magnets MS1 and MS2 and the vibration generator 510 may not overlap the display circuit board 310 and the battery hole BH and second camera hole CMH2 may be formed in the middle frame 600 in the thickness direction (Z-axis direction) of the display panel 300.

When the magnets MS1 and MS2 and the vibration generator 510 overlap the battery hole BH in which a battery is disposed, the magnets MS1 and MS2 and the vibration generator 510 may be affected by the heat generated from the battery. In some exemplary embodiments the magnets MS1 and MS2 and the vibration generator 510 may be disposed not to overlap the battery hole BH in the thickness direction (Z-axis direction) of the display panel 300.

The main circuit board 700 may be disposed under the middle frame 600. The main circuit board 700 may be a printed circuit board or a flexible printed circuit board.

The main circuit board 700 may include a main processor 710, a camera device 720, a main connector 730, a front camera 740, and a microphone 750. The camera device 720 may be disposed on both the upper surface and lower surface of the main circuit board 700, the main processor 710 may be disposed on the upper surface of the main circuit board 700, and the main connector 730 may be disposed on the lower surface of the main circuit board 700.

The main processor 710 may control all the functions of the display device 10. For example, the main processor 710 may output digital video data to the display driving unit 320 through the display circuit board 310 such that the display panel 300 may display an image. Further, the main processor 710 may receive touch data from the touch driving unit 330, may determine the touch position of a user, and then may execute an application indicated by an icon displayed at the touch position of the user. Further, the main processor 710 may receive touch data from the touch driving unit 220, and may execute an application indicated by an icon displayed at the touch position of the user according to the touch data.

The main processor 710 may output vibration data to the vibration driving circuit 340 for driving the vibration generator 510 in order for the display panel 300 to be vibrated by the vibration generator 510 to output a sound.

The main processor 710 may be an application processor, a central processing unit, or a system chip, which may include an integrated circuit.

The camera device 720 can process an image frame such as a still image or a moving image obtained by an image sensor in a camera mode, and output the processed image frame to the main processor 710.

The cable having passed through the cable hole CAH of the middle frame 600 may be connected to the man connector 730. Thus, the main circuit board 700 may be electrically connected to the display circuit board 310 and the touch circuit board 210.

In addition, the main circuit board 700 may be further provided with a mobile communication module capable of transmitting and receiving a radio signal to/from at least one of a base station, an external terminal, and a server. The radio signal may include various types of data depending on a voice signal, a video call signal, or a text/multimedia message transmission/reception.

The lower cover 900 may be disposed under the middle frame 600 and the main circuit board 700. The lower cover 900 may be engaged and fixed to the middle frame 600. The lower cover 900 may form a lower surface appearance of the display device 10. The lower cover 900 may include plastic and/or metal.

The lower cover 900 may be provided with a third camera hole CMH3 into which the camera device 720 may be inserted to protrude outward. The position of the camera device 720 and the positions of the second and third camera holes CMH2 and CMH3 corresponding to the camera device 720 are exemplified by the embodiment shown in FIG. 2.

According to the exemplary embodiment shown in FIGS. 1 and 2, the vibration generator 510 for vibrating the display panel 300 to output a sound and the magnets MS1 and MS2 may be disposed on one surface of the display panel 300. For instance, it is possible to output sound using the display panel 300 as a vibration surface by using the vibration generator 510 which may not be exposed to the outside. In some exemplary embodiments, because a call receiver for outputting a voice of the counterpart on the front face of the display device may be omitted, the light transmitting area DA100 of the cover window 100 may be enlarged, and thus the area where the image is displayed by the display panel 300 may be enlarged. Further, vibration characteristics may be improved by the magnets MS1 and MS2 to improve sound output, and a cantilever portion may be formed in the vibration generator 510 to reinforce low sound characteristics.

Figure 3:
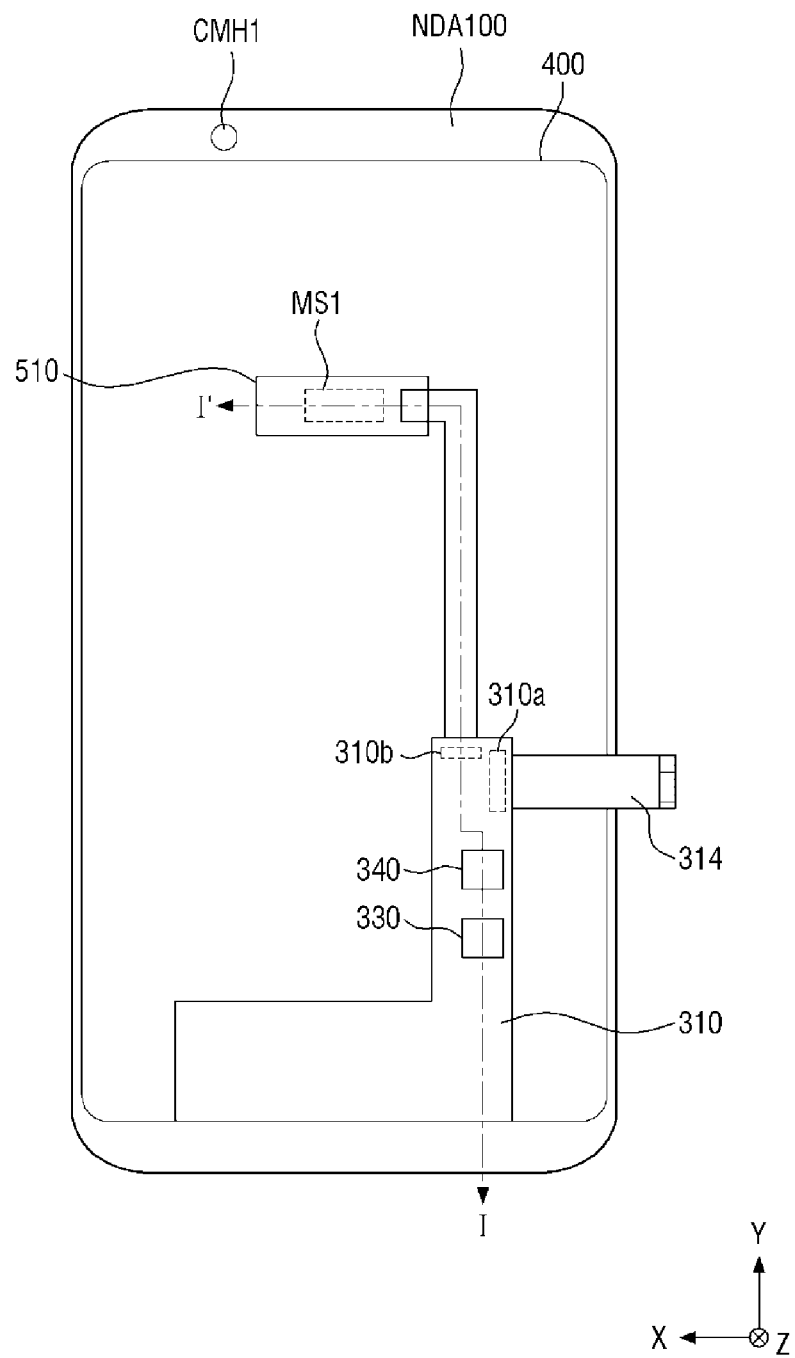
FIG. 3 is a bottom view showing a display panel attached to a cover window of FIG. 2 according to some exemplary embodiments.
Figure 4:
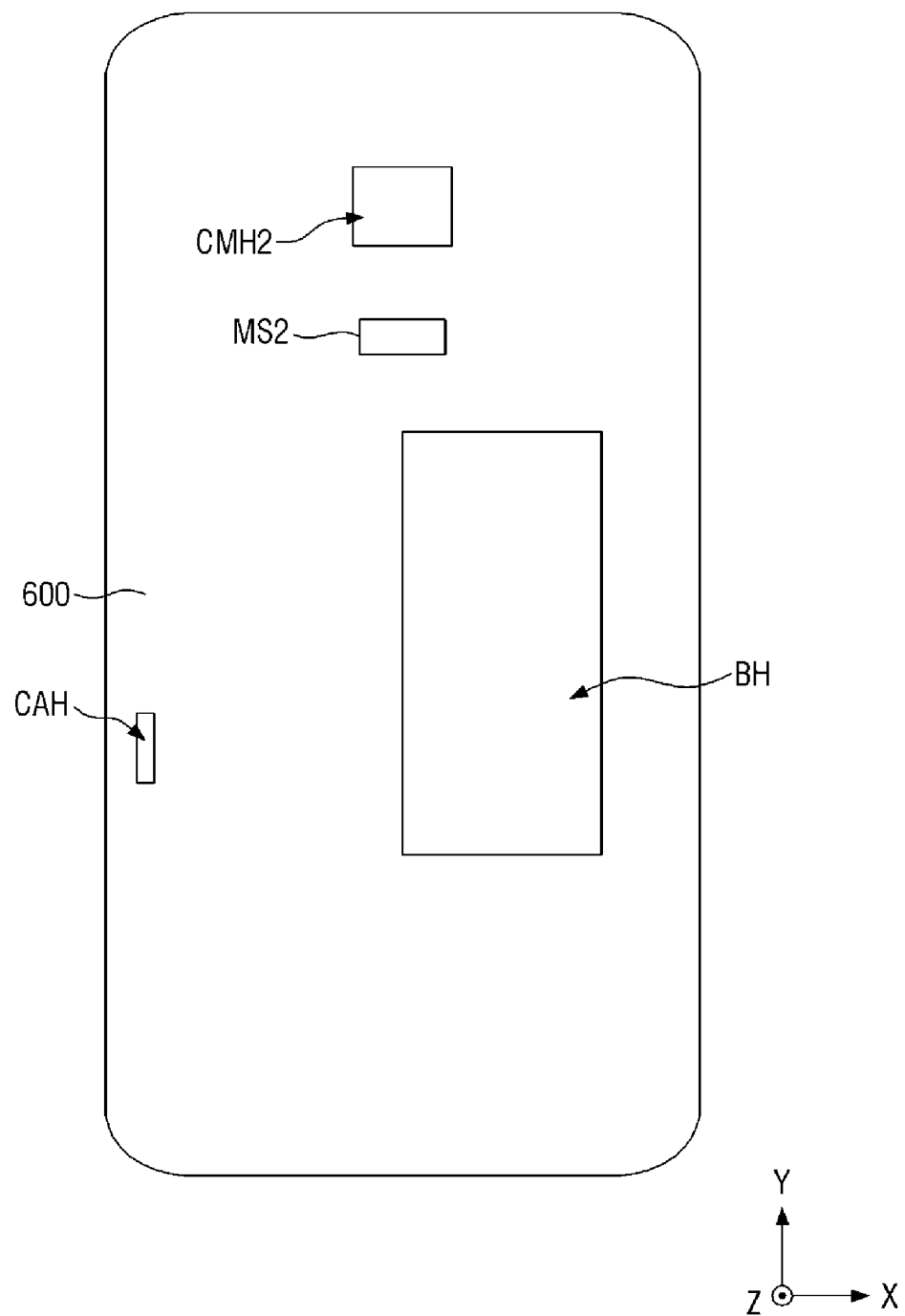
FIG. 4 is a plan view showing an example of a middle frame of FIG. 2 according to some exemplary embodiments.
Figure 5:
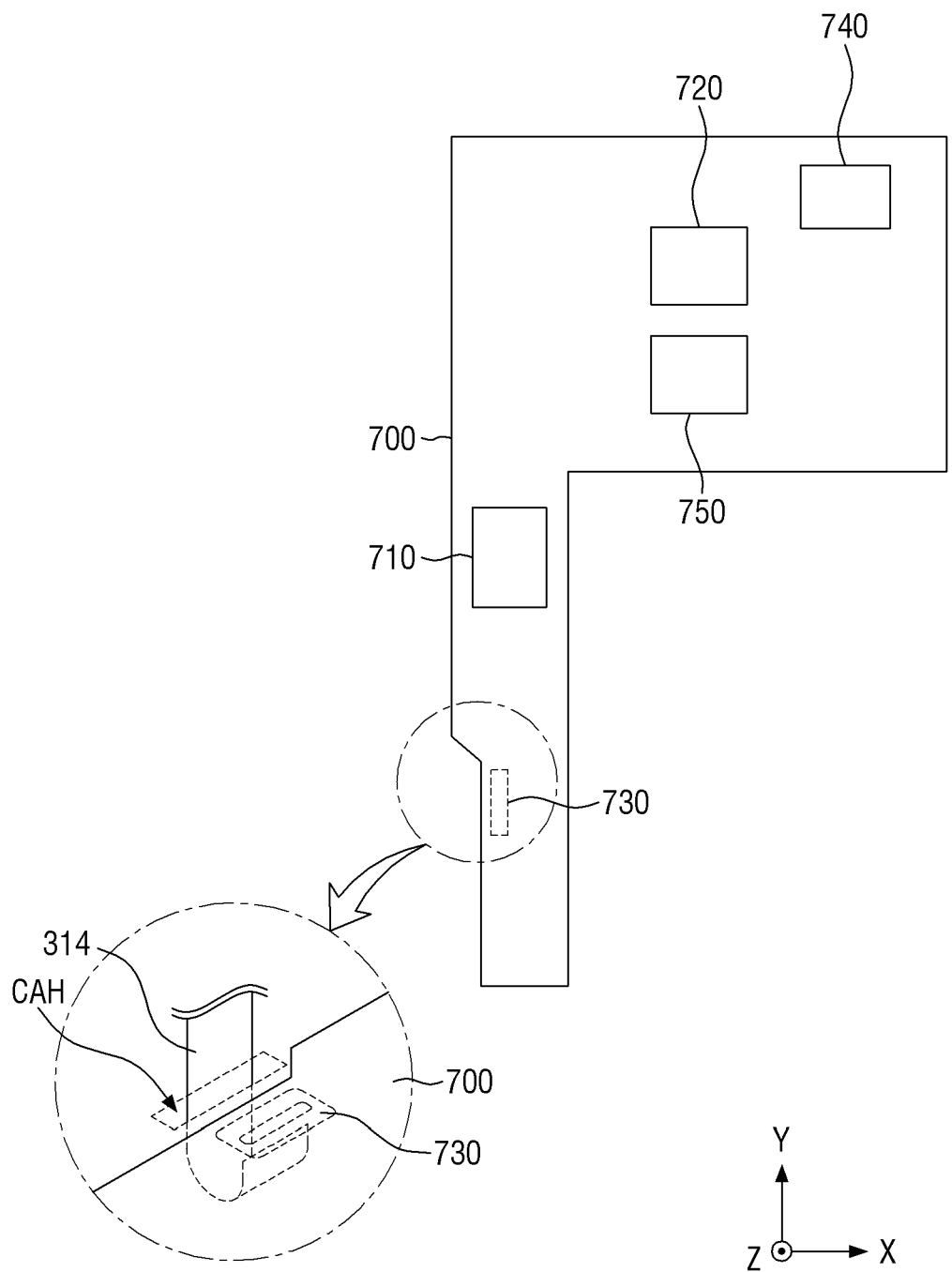
FIG. 5 is a plan view showing a main circuit board of FIG. 2 according to some exemplary embodiments.

FIG. 3 is a bottom view showing a display panel attached to a cover window of FIG. 2 according to some exemplary embodiments. FIG. 4 is a plan view showing an example of a middle frame of FIG. 2 according to some exemplary embodiments. FIG. 5 is a plan view showing a main circuit board of FIG. 2 according to some exemplary embodiments.

Referring to FIGS. 3 to 5, the panel lower cover 400 may be disposed under the display panel 300. The panel lower cover 400 may be attached to the lower surface of the display panel 300 via an adhesive member. The adhesive member may be a pressure sensitive adhesive (PSA).

Figure 8:
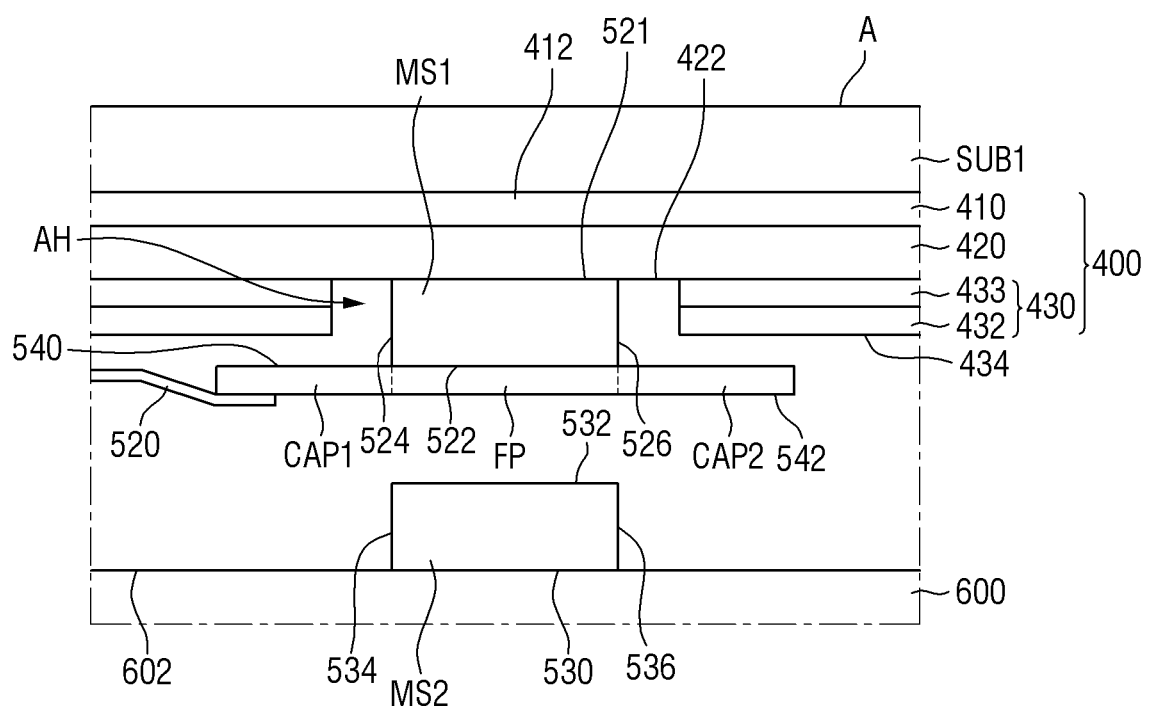
FIG. 8 is an enlarged cross-sectional view of area A of FIG. 6 according to some exemplary embodiments.

The vibration generator 510 and the first magnet MS1 may be disposed under the panel lower cover 400. The first magnet MS1 may be attached to the lower surface of the panel lower cover 400 via an adhesive member. The adhesive member may be a pressure sensitive adhesive (PSA). Further, the vibration generator 510 may be attached to the lower surface 522, as depicted in FIG. 8 discussed hereinafter, of the first magnet MS1 via an adhesive member. For instance, the area of the first magnet MS1 may be smaller than the area of the vibration generator 510. However, exemplary embodiments are not limited thereto. In some exemplary embodiments, the area of the first magnet MS1 may be equal to or larger than the area of the vibration generator 510.

In some exemplary embodiments, the first magnet MS1 may overlap the center portion of the vibration generator 510 in the third direction (Z-axis direction). However, exemplary embodiments are not limited thereto. In some exemplary embodiments, the first magnet MS1 may be positioned at one end or the other end of the vibration generator 510, and may overlap the vibration generator 510 in the third direction (Z-axis direction).

Although it is shown in FIGS. 2 to 4 that each of the vibration generator 510 and the magnets MS1 and MS2 may have a rectangular (or generally rectangular) shape, this is an example, and each of the vibration generator 510 and the magnets MS1 and MS2 may have various shapes such as a polygonal (or generally polygonal) shape, a circular (or generally circular) shape, and an elliptical (or generally elliptical) shape.

The vibration generator 510 may be electrically connected to the vibration driving circuit 340 driving the vibration generator 510 through a flexible circuit board 520. Although it is shown in FIG. 3 that the flexible circuit board 520 may be bent once, the shape of the flexible circuit board 520 is not limited thereto. The flexible circuit board 520 may be a flexible printed circuit board that can be bent.

The display circuit board 310 may be bent as shown in FIG. 3 to be disposed under the panel lower cover 400. The display circuit board 310 may include a first connector 310a and a second connector 310b as shown in FIG. 3. The first connector 310a may be connected to one end of the cable 314. The second connector 310b may be connected to one end of the flexible circuit board 520. The touch driving circuit 330 and the vibration driving circuit 340 may be disposed on one surface of the display circuit board 310, and the first connector 310a and the second connector 310b may be disposed on the other surface of the display circuit board 310 which is opposite to the one surface thereof. The other surface of the display circuit board 310 may be a surface facing the panel lower cover 400.

One end of the cable 314 may be connected to the first connector 310a. The other end of the cable 314 may be connected to the main connector 730 of the main circuit board 700 disposed under the middle frame 600 through a cable hole CAH penetrating the middle frame 600, as shown in FIGS. 4 and 5.

One end of the flexible circuit board 520 may be connected to the second connector 320b. The other end of the flexible circuit board 520 may be provided with a pad portion including pads electrically connected to the vibration generator 510.

Figure 6:
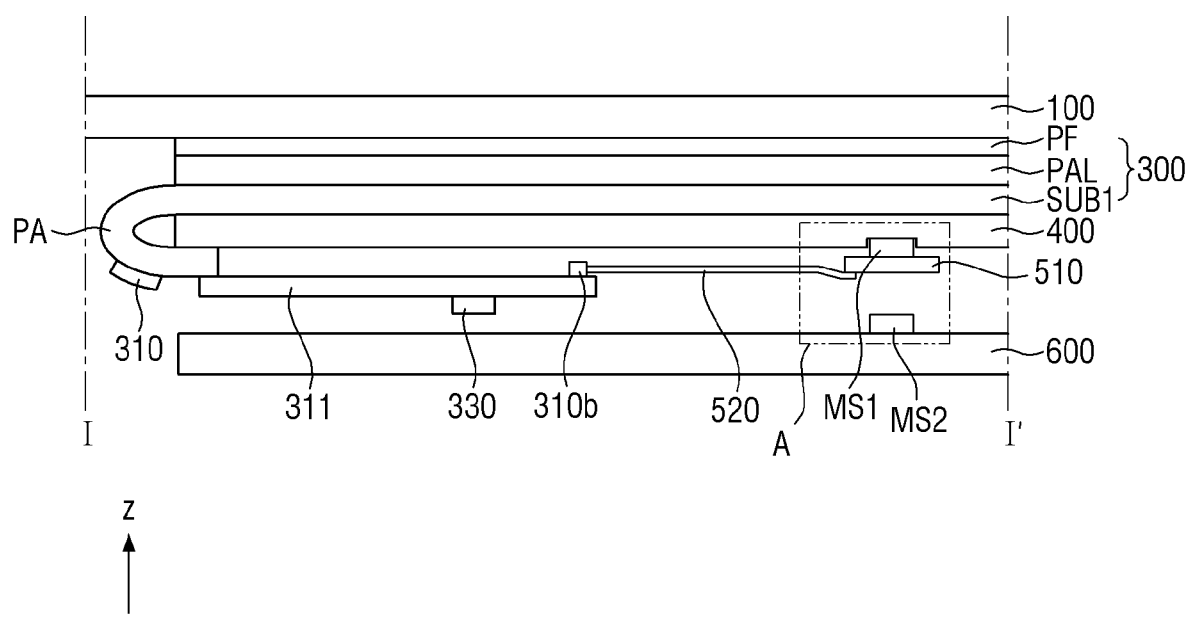
FIG. 6 is a cross-sectional view taken along sectional line I-I' of FIG. 3 according to some exemplary embodiments.
Figure 7:
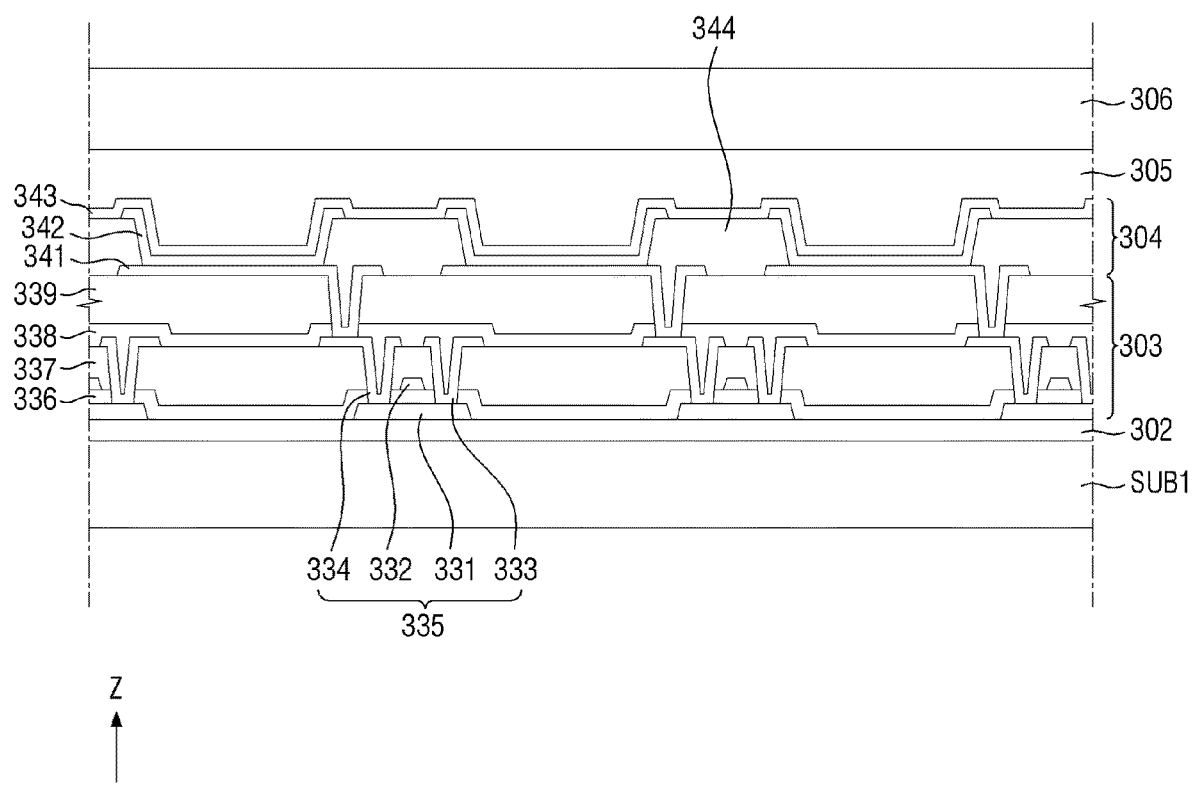
FIG. 7 is a cross-sectional view specifically showing a display area of a display panel of FIG. 6 according to some exemplary embodiments.
Figure 9:
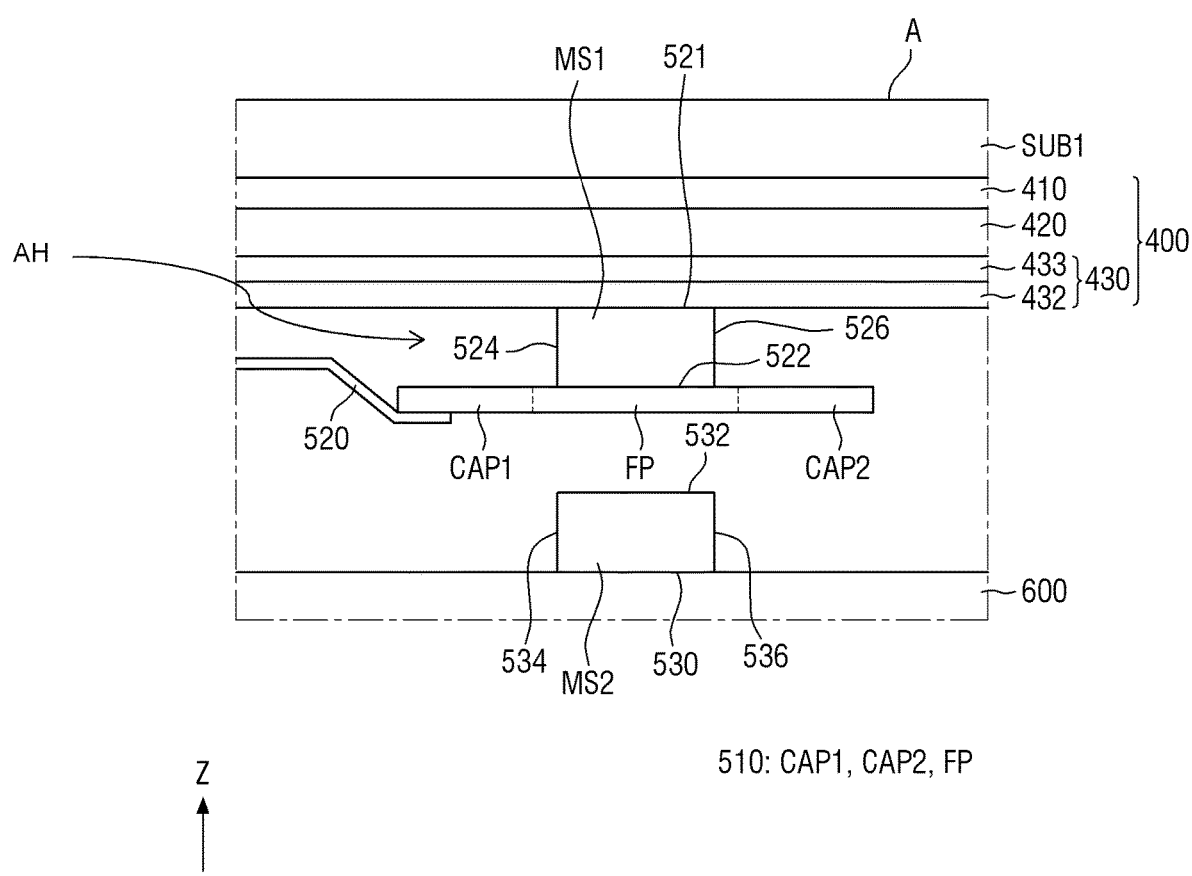
FIG. 9 is an enlarged cross-sectional view of area A of FIG. 6 according to some exemplary embodiments.

FIG. 6 is a cross-sectional view taken along sectional line I-I' of FIG. 3 according to some exemplary embodiments. FIG. 7 is a cross-sectional view specifically showing a display area of a display panel of FIG. 6 according to some exemplary embodiments. FIG. 8 is an enlarged cross-sectional view of area A of FIG. 6 according to some exemplary embodiments. FIG. 9 is an enlarged cross-sectional view of area A of FIG. 6 according to some exemplary embodiments.

Referring to FIGS. 6 to 9, the display panel 300 may include a substrate SUB1 and a pixel array layer PAL. The pixel array layer PAL may include a thin film transistor layer 303, a light emitting element layer 304, and a thin film encapsulation layer 305 as shown in FIG. 7. The display area DA of the display panel 300 may indicate an area where pixels of the light emitting element layer 304 are disposed (or formed) to display an image, and the non-display area NDA thereof indicates a peripheral area of the display area DA.

The substrate SUB1 may be a rigid substrate or a flexible substrate capable of bending, folding, rolling, or the like. The substrate SUB1 may be made of an insulating material such as a glass, a quartz, or a polymer resin. Examples of the polymer resin may include at least one of a polyethersulphone (PES), a polyacrylate (PA), a polyarylate (PAR), a polyetherimide (PEI), a polyethylenenapthalate (PEN), a polyethylene terepthalate (PET), a polyphenylenesulfide (PPS), a polyallylate, a polyimide (PI), a polycarbonate (PC), a cellulosetriacetate (CAT), a cellulose acetate propionate (CAP), and combinations thereof. The substrate SUB1 may include a metal material.

The thin film transistor layer 303 may be disposed on the substrate SUB1. The thin film transistor layer 303 may include thin film transistors 335, a gate insulating film 336, an interlayer insulating film 337, a protective film 338, and a planarization film 339.

A buffer film 302 may be formed between the substrate SUB1 and the thin film transistor layer 303. The buffer film 302 may be formed between the substrate SUB1 and the thin film transistor layer 303 so as to protect thin film transistors 335 and light emitting elements from moisture penetrating through the substrate SUB1, which can be vulnerable to moisture. The buffer film 302 may be formed of a plurality of alternately laminated inorganic films. For example, the buffer film 302 may be formed as a multi-layer film in which one or more inorganic layers including one or more of a silicon oxide ($SiO_x$), a silicon nitride ($SiN_x$), and SiON are alternately stacked. In some exemplary embodiments, the buffer film 302 may be omitted.

The thin film transistors 335 may be formed on the buffer film 302. Each of the thin film transistors 335 may include an active layer 331, a gate electrode 332, a source electrode 333, and a drain electrode 334. Although it is shown in FIG. 7 that the thin film transistor 335 is formed by a top gate manner in which the gate electrode 332 is located on the active layer 331, some exemplary embodiments are not limited thereto. For instance, the thin film transistors 335 may be formed by a bottom gate manner in which the gate electrode 332 may be located beneath the active layer 331, or may be formed by a double gate manner in which the gate electrode 332 may be located both on and beneath the active layer 331.

Explaining the top gate manner as an example, the active layer 331 may be formed on the buffer film 302. The active layer 331 may be formed of a silicon-based semiconductor material or an oxide-based semiconductor material. A light blocking layer for blocking external light incident on the active layer 331 may be formed between the buffer film 302 and the active layer 331.

The gate insulating film 336 may be formed on the active layer 331. The gate insulating film 336 may be formed of an inorganic film, for example, at least one of a silicon oxide ($SiO_x$) film, a silicon nitride ($SiN_x$) film, or a multi-layer film thereof.

The gate electrode 332 and a gate line may be formed on the gate insulating film 336. The gate electrode 332 and the gate line may be formed of a single layer or a multi-layer including at least one of molybdenum (Mo), aluminum (Al), chromium (Cr), gold (Au), titanium (Ti), nickel (Ni), neodymium (Nd) and copper (Cu), or an alloy thereof.

The interlayer insulating film 337 may be formed on the gate electrode 332 and the gate line. The interlayer insulating film 337 may be formed of an inorganic film, for example, at least one of a silicon oxide ($SiO_x$) film, a silicon nitride ($SiN_x$) film, or a multi-layer film thereof.

The source electrode 333, the drain electrode 334, and a data line may be formed on the interlayer insulating film. At least one or each of the source electrode 333 and the drain electrode 334 may be connected to the active layer 331 through a contact hole penetrating the gate insulating film 336 and the interlayer insulating film 337. The source electrode 333, the drain electrode 334, and the data line may be formed of a single layer or a multi-layer including at least one of molybdenum (Mo), aluminum (Al), chromium (Cr), gold (Au), titanium (Ti), nickel (Ni), neodymium (Nd) and copper (Cu), or an alloy thereof.

The protective film 338 for insulating the thin film transistor 335 may be formed on the source electrode 333, the drain electrode 334, and the data line. The protective film 338 may be formed of an inorganic film, for example, at least one of a silicon oxide ($SiO_x$) film, a silicon nitride ($SiN_x$) film, or a multi-layer film thereof.

The planarization film 339 for flattening a step due to the thin film transistor 335 may be formed on the protective film 338. The planarization film 339 may be formed of an organic film including an acryl resin, an epoxy resin, a phenolic resin, a polyamide resin, or a polyimide resin.

The light emitting element layer 304 may be formed on the thin film transistor layer 303. The light emitting element layer 304 may include light emitting elements and a pixel defining film 344.

The light emitting elements and the pixel defining film 344 may be formed on the planarization film 339. The light emitting element may be an organic light emitting element including an anode electrode 341, a light emitting layer 342, and a cathode electrode 343.

The anode electrode 341 may be formed on the planarization film 339. The anode electrode 341 may be connected to the source electrode 333 of the thin film transistor 335 through a contact hole penetrating the protective film 338 and the planarization film 339.

The pixel defining film 344 may be formed on the planarization film 339 to cover the edge of the anode electrode 341 so as to define pixels. For instance, the pixel defining film 344 serves to define pixels. At least one or each of the pixels refers to an area where the anode electrode 341, the light emitting layer 342, and the cathode electrode 343 are sequentially laminated, and holes from the anode electrode 341 and electrons from the cathode electrode 343 are combined with each other in the light emitting layer 342 to emit light.

The light emitting layers 342 are formed on the anode electrode 341 and the pixel defining film 344. The light emitting layers 342 are organic light emitting layers. The light emitting layer 342 may emit one of red light, green light, and blue light. The light emitting layer 342 may be a white light emitting layer that emits white light. In this case, the light emitting layer 342 may have a laminate structure of a red light emitting layer, a green light emitting layer, and a blue light emitting layer, and may be a common layer formed commonly in the pixels. In this case, the display panel 300 may further include separate color filters for displaying red, green, and blue colors.

The light emitting layer 342 may include a hole transporting layer, a light emitting layer, and an electron transporting layer. Further, the light emitting layer 342 may be formed to have a tandem structure of two stacks or more, and in this case, a charge generating layer may be formed between the stacks.

The cathode electrode 343 may be formed on the light emitting layer 342. The cathode electrode 343 may be formed to cover the light emitting layer 342. The cathode electrode 343 may be a common layer formed commonly in the pixels.

When the light emitting element layer 304 is formed by a top emission manner in which light is emitted upward, the anode electrode 341 may be formed of a high-reflectance metal material such as at least one of a laminate structure (Ti/Al/Ti) of aluminum and titanium, a laminate structure (ITO/Al/ITO) of aluminum and TIO, an APC alloy, or a laminate structure (ITO/APC/ITO) of an APC alloy and ITO. The APC alloy may be an alloy of silver (Ag), palladium (Pd), and copper alloy (Cu). The cathode electrode 343 may be formed of a transparent conductive material (TCO) such as ITO or IZO, which is light-transmissive, or a semi-transmissive conductive material such as at least one of magnesium (Mg), silver (Ag), or an alloy of magnesium (Mg) and silver (Ag). When the cathode electrode 343 is formed of a semi-transmissive conductive material, light emission efficiency may be increased by microcavities.

When the light emitting element layer 304 is formed by a bottom emission manner in which light is emitted downward, the anode electrode 341 may be formed of a transparent conductive material (TCO) such as ITO or IZO, or a semi-transmissive conductive material such as magnesium (Mg), silver (Ag), or an alloy of magnesium (Mg) and silver (Ag). The cathode electrode 343 may be formed of a high-reflectance metal material such as a laminate structure (Ti/Al/Ti) of aluminum and titanium, a laminate structure (ITO/Al/ITO) of aluminum and TIO, an APC alloy, or a laminate structure (ITO/APC/ITO) of an APC alloy and ITO. When the anode electrode 341 is formed of a semi-transmissive conductive material, light emission efficiency may be increased by microcavities.

The thin film encapsulation layer 305 may be formed on the light emitting element layer 304. The thin film encapsulation layer 305 may serve to prevent oxygen or moisture from permeating the light emitting layer 342 and the cathode electrode 343. For instance, the thin film encapsulation layer 305 may include at least one inorganic film. The inorganic film may be formed of at least one of a silicon nitride, an aluminum nitride, a zirconium nitride, a titanium nitride, a hafnium nitride, a tantalum nitride, a silicon oxide, an aluminum oxide, or a titanium oxide. The thin film encapsulation layer 305 may further include at least one organic film. The organic film may be formed to have a sufficient thickness to prevent foreign matter (particles) from penetrating the thin film encapsulation layer 305 and entering the light emitting layer 342 and the cathode electrode 343. The organic film may include any one of an epoxy, an acrylate, and a urethane acrylate.

A touch sensor layer may be formed on the thin film encapsulation layer 305. When the touch sensor layer is formed directly on the thin film encapsulation layer 305, advantageously the thickness of the display device 10 may be reduced, as compared to when a separate touch panel is attached onto the thin film encapsulation layer 305.

The touch sensor layer may include touch electrodes for sensing a touch of a user in a capacitance manner, and touch lines for connecting the pads and the touch electrodes. For example, the touch sensor layer may sense a user's touch by a self-capacitance manner or a mutual capacitance manner.

The touch electrodes of the touch sensor layer may be arranged in the display area DA, and the touch lines of the touch sensor layer may be arranged in the non-display area NDA.

A polarizing film PF may be disposed on the pixel array layer PAL of the display panel 300 to prevent the deterioration of visibility due to external light reflection as shown in FIG. 6. The polarizing film PF may include a linear polarizer and a phase retardation film such as a quarter-wave plate. In this case, the phase retardation film may be disposed on the display panel 300, and the linear polarizer may be disposed between the phase retardation film and the cover window 100.

The cover window 100 may be disposed on the polarizing film PF. The cover window 100 may be attached to the upper surface of the polarizing film PF via an adhesive member. The cover window 100 may be made of at least one of a glass, a sapphire, and/or a plastic. The cover window 100 may be rigid or flexible. The adhesive member may be at least one of an optically clear adhesive (OCA) film or an optically clear resin (OCR) film.

The panel lower cover 400 may be disposed under the substrate SUB1 of the display panel 300. As shown in FIG. 8, the panel lower cover 400 may include a light absorbing member 410 for absorbing light incident from the outside, a buffer member 420 for absorbing external impact, and a heat radiation member 430 for efficiently radiating heat of the display panel 300.

The light absorbing member 410 may be disposed under the display panel 300. The light absorbing member 410 can inhibit the transmission of light to prevent components disposed under the light absorbing member, for example, a display circuit board 310, a vibration generator 510, and the like from being viewed from above the display panel 300. The light absorbing member 410 may include a light absorbing material such as a black pigment or a dye.

The buffer member 420 may be disposed under the light absorbing member 410. The buffer member 420 can absorb an external impact to prevent the display panel 300 from being damaged. The buffer member 420 may be formed as a single layer or a plurality of layers. For example, the buffer member 420 may be formed of at least one of a polymer resin such as a polyurethane, a polycarbonate, a polypropylene, or a polyethylene, or may be formed of an elastic material such as a rubber, a urethane material, or a sponge formed by foaming an acrylic material. The buffer member 420 may be a cushion layer.

The heat radiation member 430 may be disposed under the buffer member 420. The heat radiation member 430 may include a first heat radiation layer 432 including a graphite or carbon nanotubes and a second heat radiation layer 433 capable of blocking electromagnetic waves and formed of a metal thin film of at least one of copper, nickel, ferrite or silver having excellent thermal conductivity.

When the first magnet MS1 is disposed on the heat radiation member 430 of the panel lower cover 400, the first heat radiation layer 432 of the heat radiation member 430 may be damaged by the vibration of the first magnet MS1 due to the vibration of the vibration generator. Therefore, in the area where the first magnet MS1 is disposed, an accommodation hole AH may be formed in which a portion of the heat radiation member 430 is removed, and the first magnet MS1 may be attached to a lower surface 422 of the buffer member 420 exposed by the accommodation hole AH. However, some exemplary embodiments are not limited thereto. In some exemplary embodiments, the accommodation hole AH may be formed by removing the buffer member 420 and the heat radiation member 430, and the first magnet MS1 may be attached to a lower surface 412 of the light absorbing member 410 exposed by the accommodation hole AH. Further, in some exemplary embodiments, as shown in FIG. 9, the accommodation hole AH may not be formed, and in this case, the first magnet MS1 may be attached to a lower surface 434 of the first heat radiation layer 432.

A first or upper surface 521 of the first magnet MS1 may be attached and fixed to the lower surface 422 of the buffer member 420 via an adhesive member, and the second or lower surface 522 of the first magnet MS1, opposite to the first surface 521 thereof, may be attached and fixed to a first or upper surface 540 of the vibration generator 510 through an adhesive. In some exemplary embodiments, the first magnet MS1 may also include side surfaces, such a first side surface 524 and a second side surface 526, and a second or lower surface 542.

The vibration generator 510 may include a fixed portion FP attached and fixed to the first magnet MS1, a first cantilever portion CAP1 disposed at one side of the fixed portion FP, and a second cantilever portion CAP2 disposed at the other side of the fixed portion FP. The first cantilever portion CAP1 and the second cantilever portion CAP2 may be spaced apart from the panel lower member 400. The first cantilever portion CAP1 and the second cantilever portion CAP2 may amplify a low-frequency band to improve the output of a sound of the low-frequency band. The low-frequency band may refer to a frequency band of 1 kHz or less. In some exemplary embodiments, the lengths of the first cantilever portion CAP1 and the second cantilever portion CAP2 in the first direction (X-axis direction) may be equal to each other. For instance, one set low-frequency band may be amplified. However, some exemplary embodiments are not limited thereto, and the lengths of the first cantilever portion CAP1 and the second cantilever portion CAP2 in the first direction (X-axis direction) may be different from each other. In this case, two set low-frequency bands may be amplified. For instance, the lengths of the first cantilever portion CAP1 and the second cantilever portion CAP2 in the first direction (X-axis direction) may be variously changed depending on the low-frequency band to be amplified.

The flexible circuit board 520 may be disposed at one side of the lower surface of the vibration generator 510. The electrodes of the vibration generator 510 may be electrically connected to the pads of the pad portion of the other end of the flexible circuit board 520 at one side of the vibration generator 510.

A first or lower surface 530 of the second magnet MS2 may be attached and fixed to an upper surface 602 of the middle frame 600 via an adhesive member. In some exemplary embodiments, the second magnet MS2 may have a second or upper surface 532 and side surfaces, such as a first side surface 534 and a second side surface 536. The second magnet MS2 may overlap the first magnet MS1 in the third direction (Z-axis direction) which is a thickness direction. The second magnet MS2 may overlap the fixed portion FP of the vibration generator 510 in the third direction (Z-axis direction), while the second magnet MS2 may be spaced apart from the vibration generator 510 in the third direction (In the Z-direction). The distance between the second magnet MS2 and the vibration generator 510 is greater than the vibration displacement of the vibration generator 510. Accordingly, even when the vibration generator 510 vibrates, the vibration generator 510 and the second magnet MS2 do not contact each other.

Figure 10:
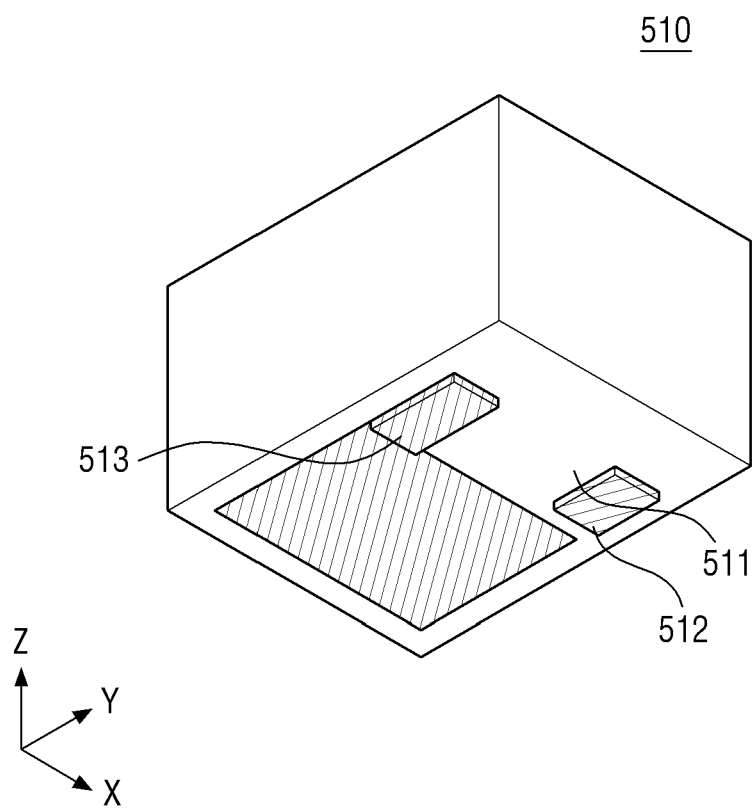
FIG. 10 is a perspective view of a vibration generator according to some exemplary embodiments.
Figure 11:
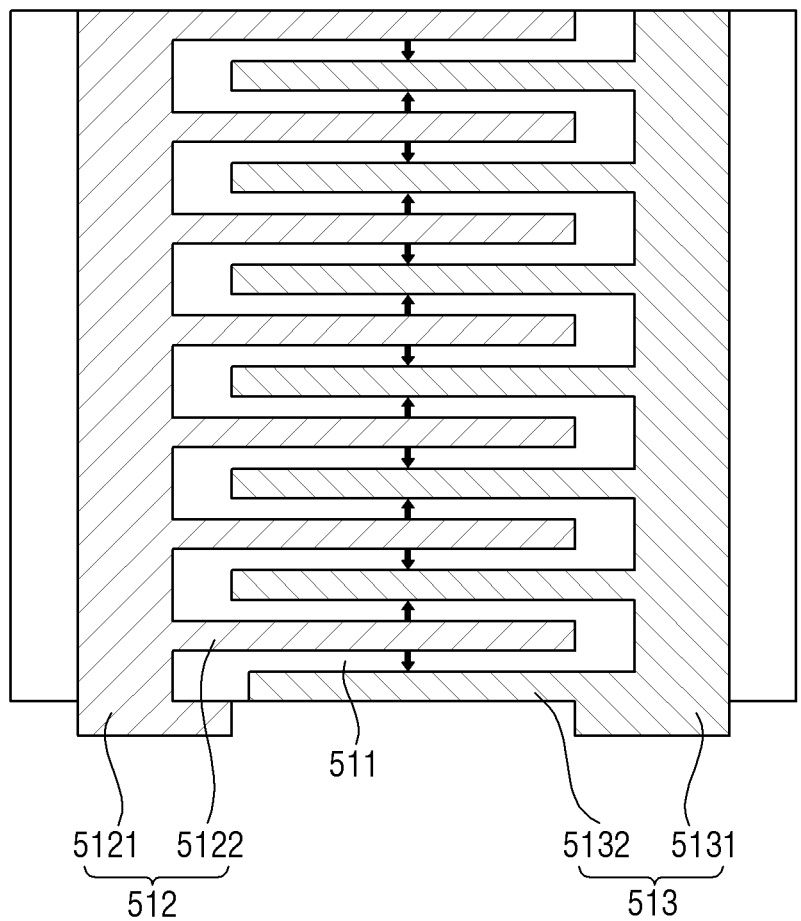
FIG. 11 is a cross-sectional view of a vibration generator according to some exemplary embodiments.
Figure 12:
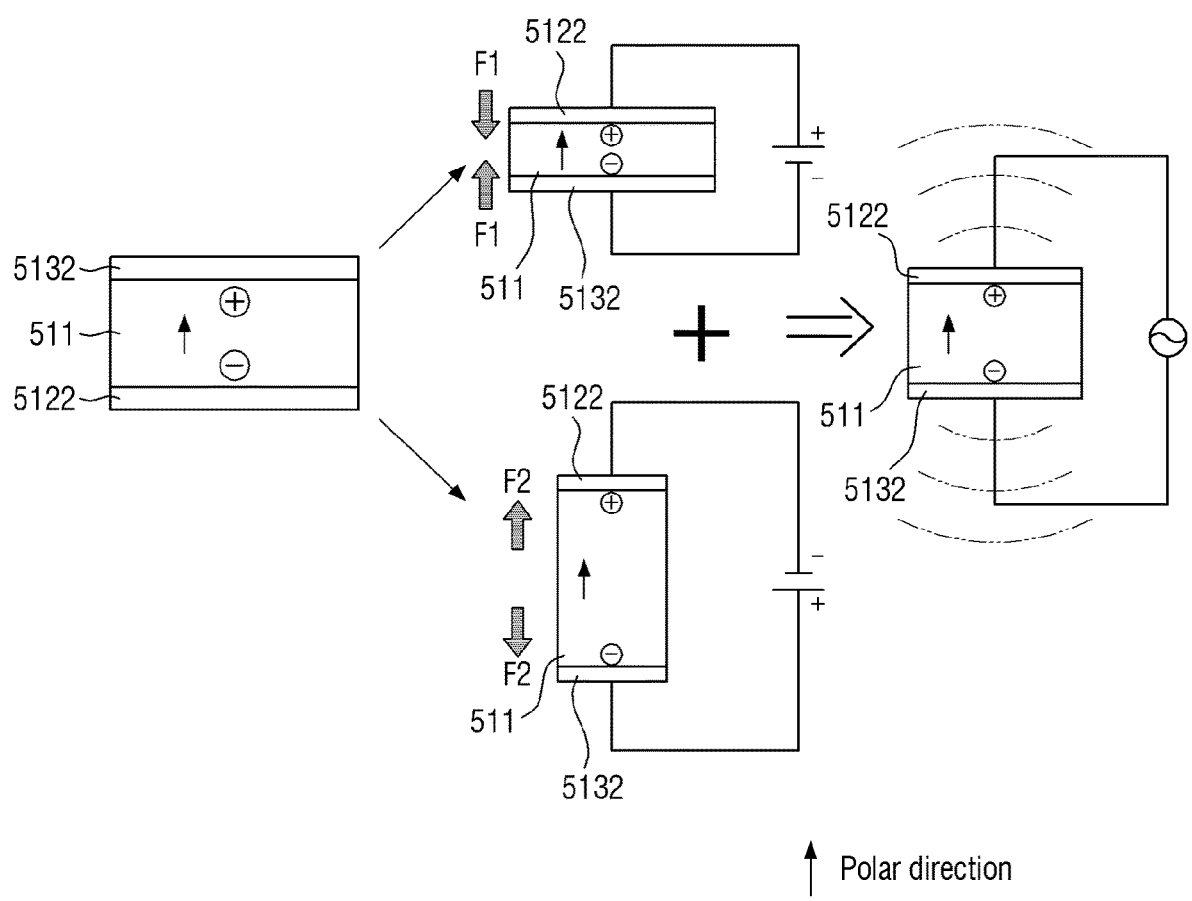
FIG. 12 is a view showing a method of vibrating a vibration layer disposed between first and second branch electrodes of a vibration generator according to some exemplary embodiments.

FIG. 10 is a perspective view of a vibration generator according to some exemplary embodiments. FIG. 11 is a cross-sectional view of a vibration generator according to some exemplary embodiments. FIG. 12 is a view showing a method of vibrating a vibration layer disposed between first and second branch electrodes of a vibration generator according to some exemplary embodiments.

Referring to FIGS. 10 to 12, the vibration generator 510 may be a piezoelectric element or a piezoelectric actuator for vibrating the display panel 300 using a piezoelectric material contracting or expanding depending on the applied voltage. The vibration generator 510 may include a vibration layer 511, a first electrode 512, and a second electrode 513. In FIGS. 10 to 12, the flexible circuit board 520 is omitted for convenience of explanation.

The first electrode 512 may include a first stem electrode 5121 and first branch electrodes 5122.

The first stem electrode 5121 may be disposed on at least one side surface of the vibration layer 511 as shown in FIG. 11. Illustratively, the first stem electrode 5121 may be disposed to penetrate a part of the vibration layer 511. In some exemplary embodiments, the first stem electrode 5121 may be disposed on the upper surface of the vibration layer 511.

The first branch electrodes 5122 may be branched from the first stem electrode 5121. The first branch electrodes 5122 may be arranged in parallel to each other.

The second electrode 513 may include a second stem electrode 5131 and second branch electrodes 5132. The second electrode 513 may be disposed to be spaced apart from the first electrode 512. Thus, the second electrode 513 may be electrically separated from the first electrode 512. The second stem electrode 5131 may be disposed on at least one side surface of the vibration layer 511. In this case, the first stem electrode 5121 may be disposed on the first side surface of the vibration layer 511, and the second stem electrode 5131 may be disposed on the second side surface of the vibration layer 511. In some exemplary embodiments, the second stem electrode 5131 may be disposed to penetrate a part of the vibration layer 511. Further, in some exemplary embodiments, the second stem electrode 5131 may be disposed on the upper surface of the vibration layer 511.

The second branch electrodes 5132 may be branched from the second stem electrode 5131. The second branch electrodes 5132 may be arranged in parallel to each other.

The first branch electrodes 5122 and the second branch electrodes 5132 may be disposed or arranged in parallel to each other in the horizontal direction (X-axis direction or Y-axis direction). Further, the first branch electrodes 5122 and the second branch electrodes 5132 may be alternately disposed or arranged in the vertical direction (Z-axis direction). For instance, the first branch electrodes 5122 and the second branch electrodes 5132 may be arranged repeatedly in the vertical direction (Z-axis direction) in order of the first branch electrode 5122, the second branch electrode 5132, the first branch electrode 5122, and the second branch electrode 5132.

The first electrode 512 and the second electrode 513 may be connected to the pads of the flexible circuit board 520. The pads of the flexible circuit board 520 may be connected to the first electrode 512 and second electrode 513 disposed on one surface of the vibration generator 510.

The vibration layer 511 may be a piezoelectric element that can be deformed in accordance with a driving voltage applied to the first electrode 512 and a driving voltage applied to the second electrode 513. In this case, the vibration layer 511 may be made of any one of a piezoelectric material such as at least one of a polyvinylidene fluoride (PVDF) or a plumbum zirconate titanate (PZT), and an electroactive polymer.

Typically the vibration layer 511 may be formed at high temperature, in some exemplary embodiments the first electrode 512 and the second electrode 513 may be formed of silver (Ag) or an alloy of silver (Ag) and palladium (Pd), each having a high melting point. When the first electrode 512 and the second electrode 513 are formed of an alloy of silver (Ag) and palladium (Pd) to increase the melting points of the first electrode 512 and the second electrode 513, the content of silver (Ag) may be higher than the content of palladium (Pd).

The vibration layer 511 may be disposed between the first branch electrodes 5122 and the second branch electrodes 5132. The vibration layer 511 can contract or expand according to the difference between a driving voltage applied to the first branch electrodes 5122 and a driving voltage applied to the second branch electrodes 5132.

Specifically, as shown in FIG. 12, the polar direction of the vibration layer 511 disposed between the first branch electrode 5122 and the second branch electrode 5132 disposed under the first branch electrode 5122 may be an upward direction (↑), the vibration layer 511 can have positive polarity in the upper region adjacent to the first branch electrode 5122, and can have negative polarity in the lower region adjacent to the second branch electrode 5132. Further, the polar direction of the vibration layer 511 disposed between the second branch electrode 5132 and the first branch electrode 5122 disposed under the second branch electrode 5132 may be a downward direction (↓), the vibration layer 511 can have negative polarity in the upper region adjacent to the second branch electrode 5132, and can have positive polarity in the lower region adjacent to the first branch electrode 5122. The polar direction of the vibration layer 511 may be determined by a poling process of applying an electric field to the vibration layer 511 using the first branch electrode 5122 and the second branch electrode 5132.

As shown in FIG. 12, in the case where the polar direction of the vibration layer 511 disposed between the first branch electrode 5122 and the second branch electrode 5132 disposed under the first branch electrode 5122 is the upward direction (↑), when a driving voltage having positive polarity is applied to the first branch electrode 5122, and a driving voltage having negative polarity is applied to the second branch electrode 5132, the vibration layer 511 may be contracted by a first force F1. The first force F1 may be a contraction force. Further, when a driving voltage having negative polarity is applied to the first branch electrode 5122, and a driving voltage having positive polarity is applied to the second branch electrode 5132, the vibration layer 511 may be expanded by a second force F1. The second force F2 may be an extension force.

For instance, in the case where the polar direction of the vibration layer 511 disposed between the second branch electrode 5132 and the first branch electrode 5122 disposed under the second branch electrode 5132 is the downward direction (↓), when a driving voltage having positive polarity is applied to the second branch electrode 5132, and a driving voltage having negative polarity is applied to the first branch electrode 5122, the vibration layer 511 may be expanded by the extension force. The first force F1 may be a contraction force. Further, when a driving voltage having negative polarity is applied to the second branch electrode 5132, and a driving voltage having positive polarity is applied to the first branch electrode 5122, the vibration layer 511 may be contracted by the contraction force.

Figure 14:
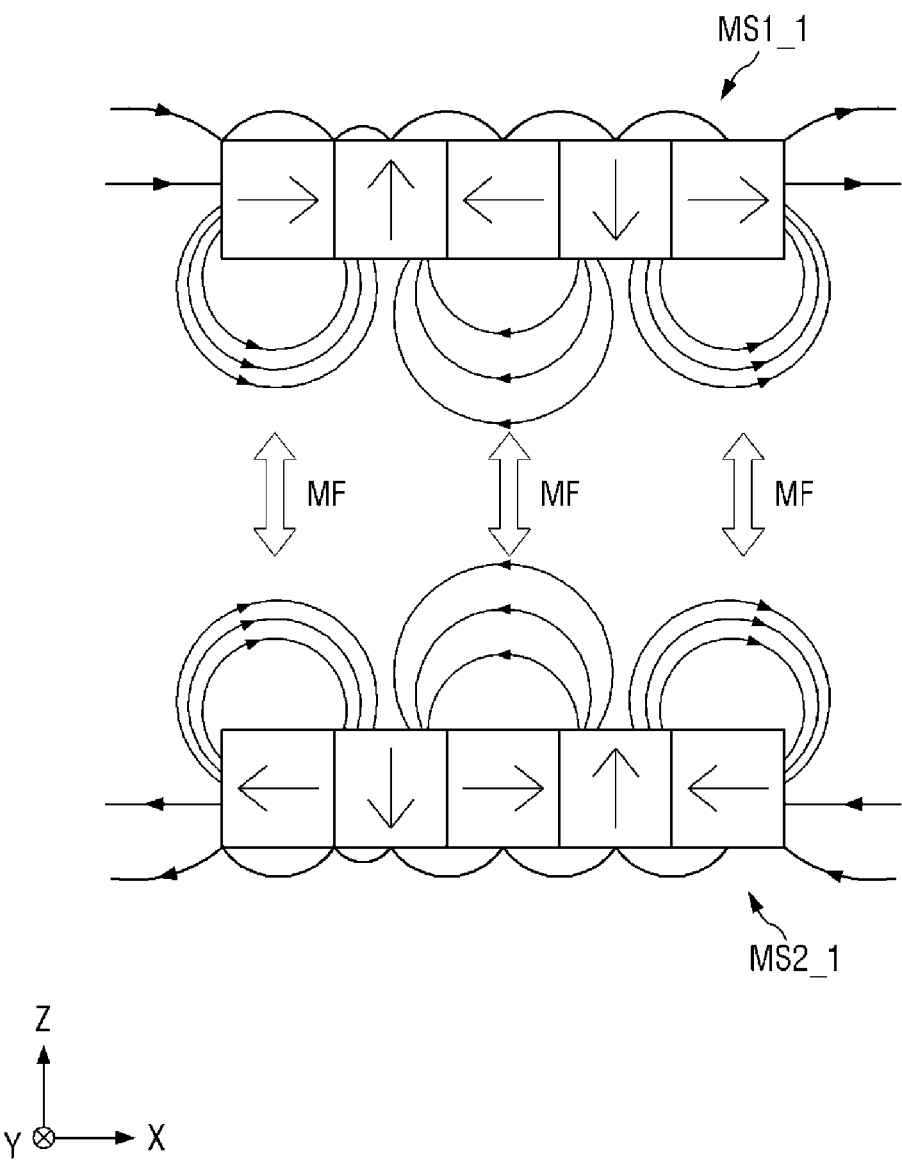
FIG. 14 is a view of magnets according to some exemplary embodiments.

FIG. 13 is a view of magnets according to some exemplary embodiments. FIG. 14 is a view of magnets according to some exemplary embodiments.

Referring to FIG. 13, in some exemplary embodiments, each of the first magnet MS1 and the second magnet MS2 may be a fixed magnet with no change in polarity. For instance, the first magnet MS1 and the second magnet MS2 may have fixed, respectively, first polarity P1 and fixed second polarity P2.

The first magnet MS1 and the second magnet MS2 may face each other in the third direction (Z-axis direction), and a magnetic field may be formed between the first magnet MS1 and the second magnet MS2. In some exemplary embodiments, the surfaces of the first magnet MS1 and the second magnet MS2, facing each other, may have the same polarity. For instance, the upper surface of the first magnet MS1 may have second polarity P2, and the lower surface of the first magnet MS1, facing the second magnet MS2, may have first polarity P1. In some exemplary embodiments, the upper surface of the second magnet MS2, facing the lower surface of the first magnet MS1 may have first polarity P1, and the lower surface of the second magnet MS2 may have second polarity P2. The first polarity P1 may be S polarity, the second polarity P2 may be N polarity. However, some exemplary embodiments are not limited thereto. The first polarity P1 may be N polarity, and the second polarity P2 may be S polarity. In some exemplary embodiments, the first magnet MS1 and the second magnet MS2 may include a magnetically rigid material such as neodymium. For instance, the neodymium magnet may include neodymium-iron-boron (Nd—Fe—B), but the material thereof is not limited thereto.

Referring to FIG. 14, in some exemplary embodiments, the first magnet MS1_1 and the second magnet MS2_1 may be formed in a Halbach array. In the Halbach array, a magnetic field MF may be formed intensively and intensely on one side of the Halbach array, and may be formed very weakly on the other side thereof because magnetic forces cancel each other. Generally, when a magnet array is formed with the same number of magnets having the same intensity, in the Halbach array, a strong magnetic field having about 1.5 times stronger than that of a series magnet array can be formed in one direction, and only a very weak magnetic field MF can be formed in a direction opposite to the direction.

For instance, in the first magnet MS1_1, N poles may be arranged in the first direction (X-axis direction) in order of a right side, an upper side, a left side, a lower side, and a right side and may be connected to each other. Thus, a magnetic field MF may be formed intensively in a direction opposite to the third direction (Z-axis direction), and a weak magnetic field MF may be formed in the third direction (Z-axis direction).

For instance, in the second magnet MS1_2, N poles may be arranged in the first direction (X-axis direction) in order of a left side, a lower side, a right side, an upper side, and a left side and may be connected to each other. Thus, a magnetic field MF may be formed intensively in the third direction (Z-axis direction), and a weak magnetic field MF may be formed in a direction opposite to the third direction (Z-axis direction). However, the arrangement of the Halbach array of the first magnet MS1_1 and the second magnet MS1_2 is an example, and is not limited thereto.

As described above, the first magnet MS1_1 and the second magnet MS1_2 may be configured in the Halbach array, there is an advantage of forming a strong magnetic field MF between the first magnet MS1_1 and the second magnet MS1_2.

Figure 15:
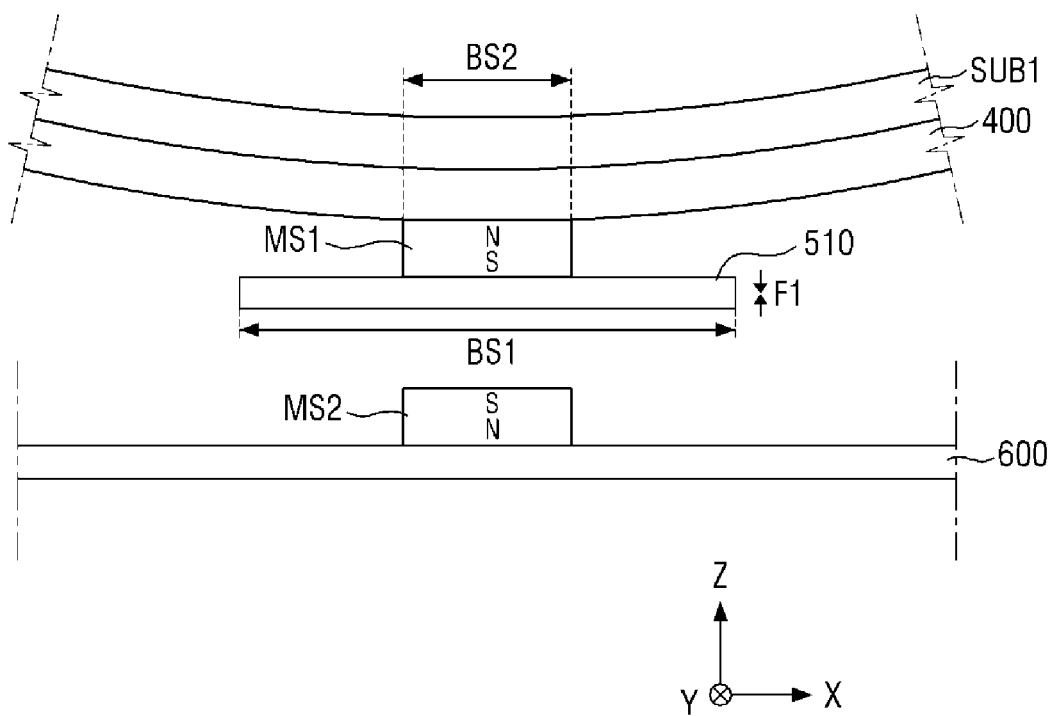
FIGS. 15 and 16 are views showing a method of vibrating a display panel according to some exemplary embodiments.
Figure 16:
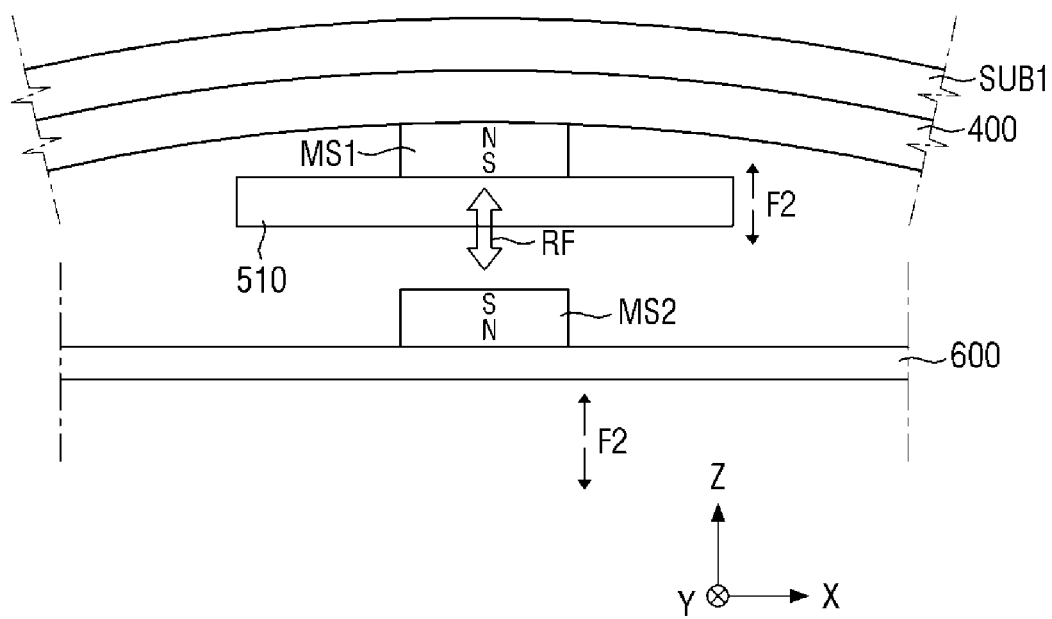

FIGS. 15 and 16 are views showing a method of vibrating a display panel according to some exemplary embodiments. FIGS. 15 and 16 show only the substrate SUB of the display panel 300 for convenience of explanation.

Referring to FIGS. 10, 15 and 16 together with FIG. 6 and other figures discussed above, when the driving voltage applied to the first electrode 512 and the driving voltage applied to the second electrode 513 may be alternately repeated in positive polarity and negative polarity, the vibration layer 511 can repeat contraction and expansion as shown in FIGS. 15 and 16. Thus, the vibration generator 510 can vibrate. As such, the vibration of the vibration layer 511 of the vibration generator 510 due to contraction and expansion may be transmitted to the first magnet MS1 to vibrate the first magnet MS1, and the display panel 300 may be vibrated in the third direction (Z-axis direction), which is a thickness direction, by the vibration of the first magnet MS1, as shown in FIGS. 15 and 16.

The vibration generator 510 can have a first vibration surface BS1, and the first magnet MS1 can have a second vibration surface BS2 having a smaller area than the first vibration surface BS1. For instance, the vibration of the vibration generator 510 having the first vibration surface BS1 may be transmitted to the display panel 300 through the first magnet MS1 including the second vibration surface BS2 having a smaller area than the first vibration surface BS1 to intensify the vibration, thereby improving the sound output of the display device 10. Further, the vibration generator 510 can include the first cantilever portion CAP1 and the second cantilever portion CAP2 to amplify a low-frequency band, thereby improving the output of a sound of the low-frequency band.

Moreover, as shown in FIG. 16, when the vibration layer 511 expands to transmit a force to the display panel 300 in the third direction (Z-axis direction), a repulsive force RF between the first magnet MS1 and the second magnet MS2 may be added, and thus there may be an advantage of increasing the force transmitted to the display panel 300 in the third direction (Z-axis direction).

Figure 17:
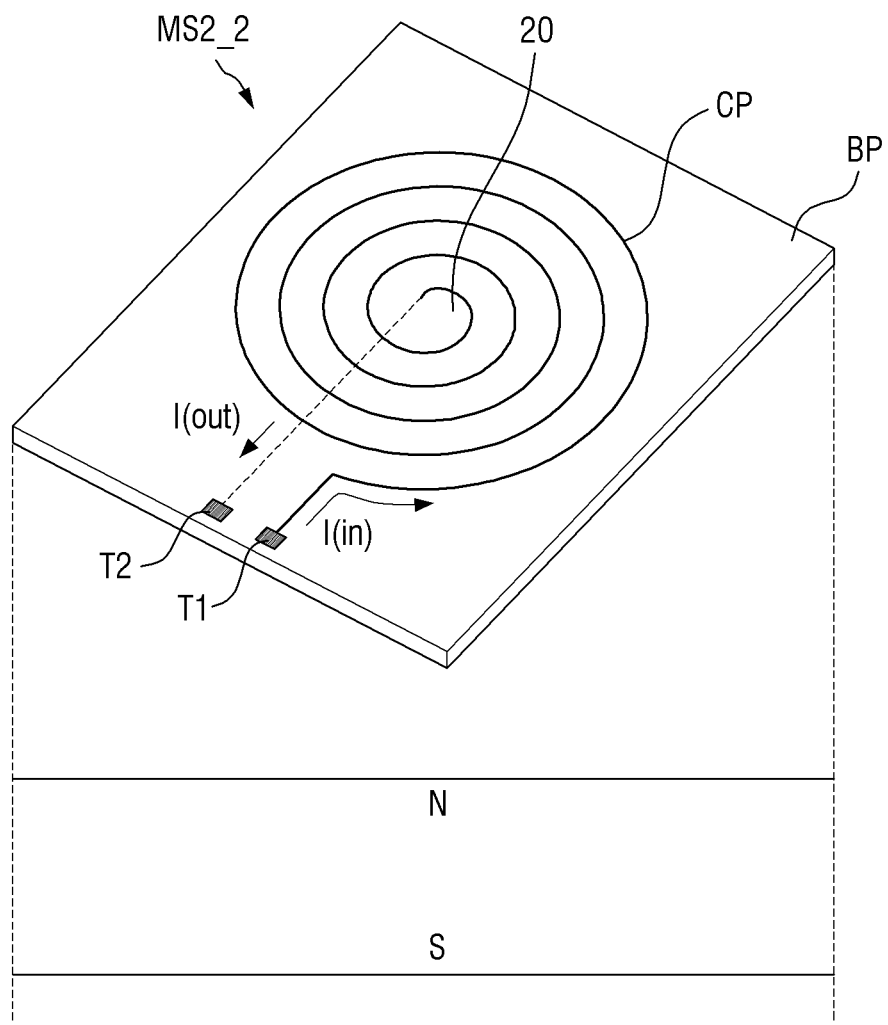
FIGS. 17 and 18 are views of a magnet according to some exemplary embodiments.
Figure 18:
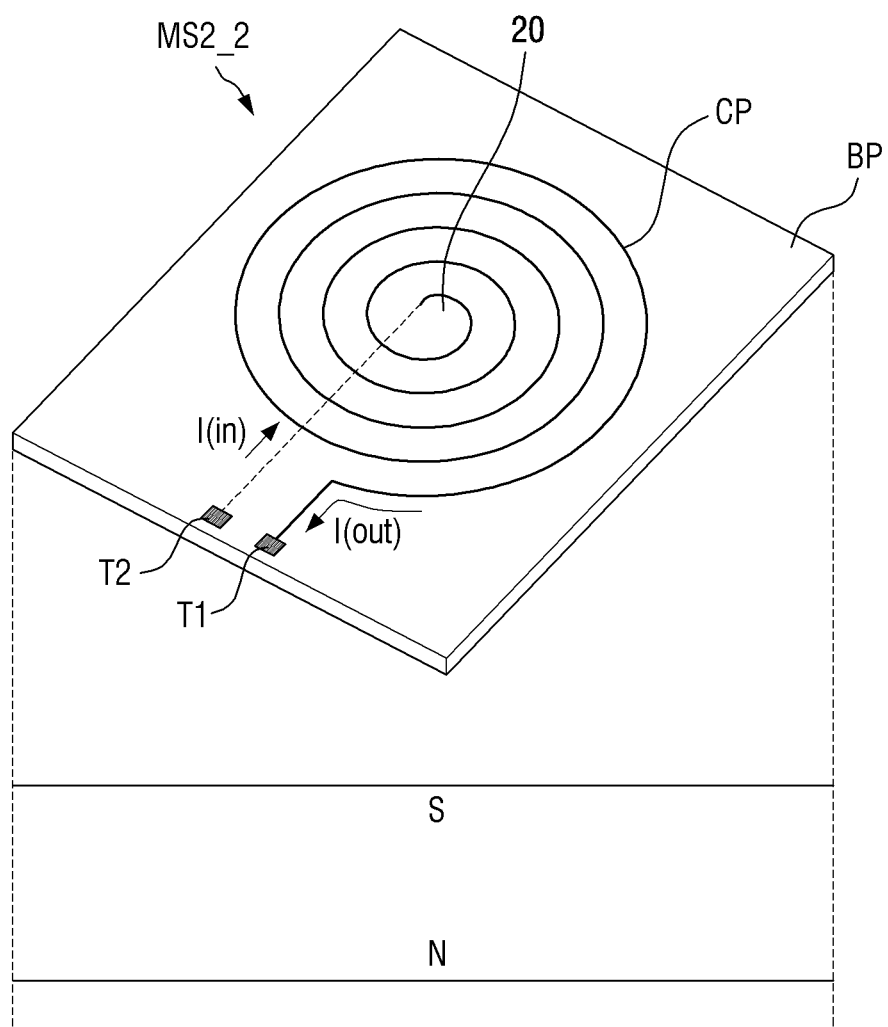
Figure 19:
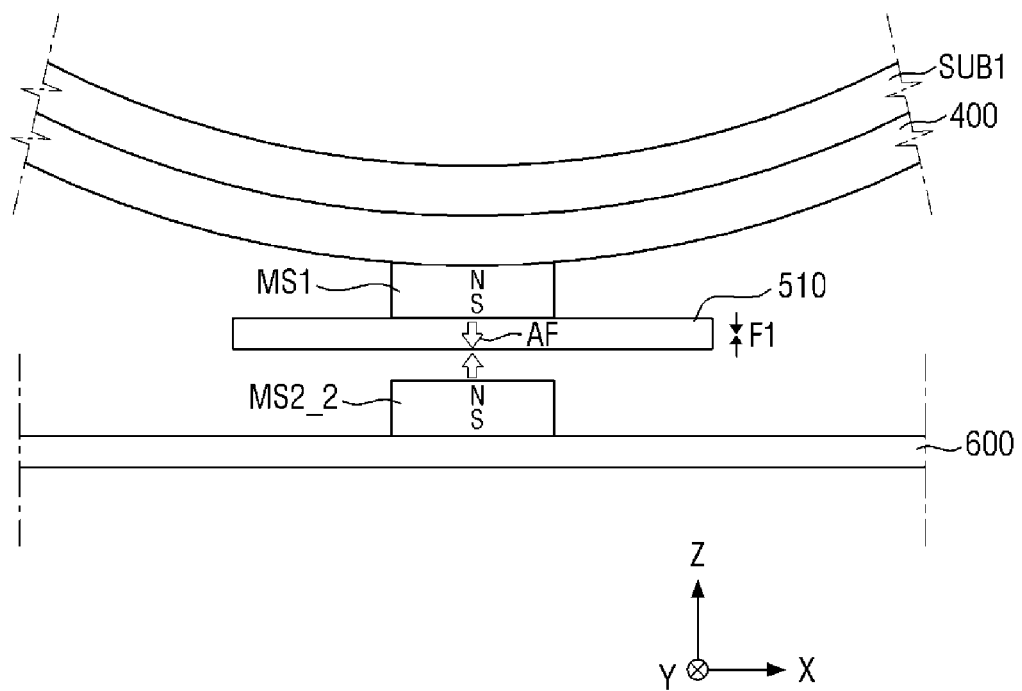
FIGS. 19 and 20 are views showing a method of vibrating a display panel according to some exemplary embodiments.
Figure 20:
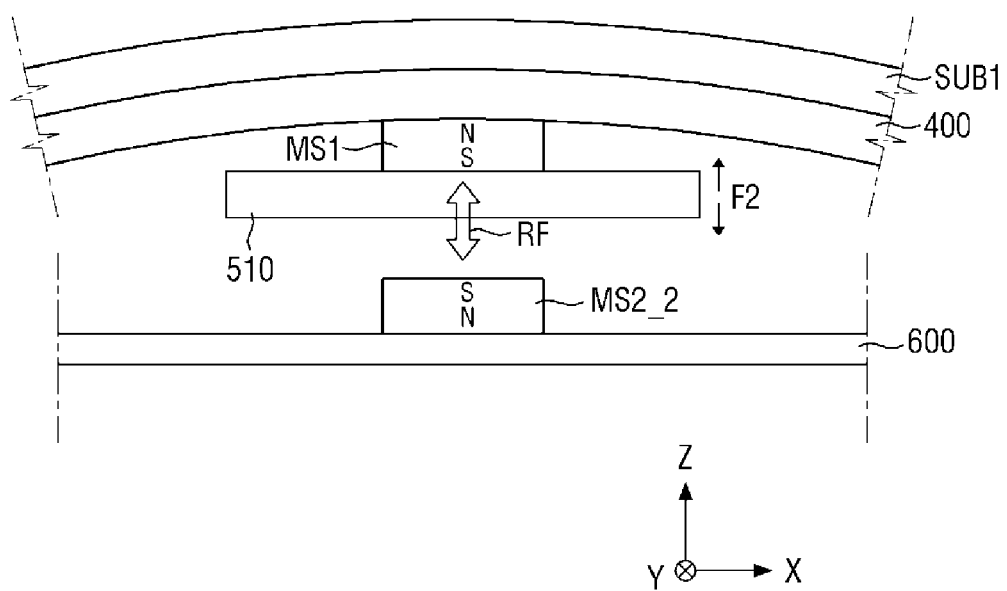

FIGS. 17 and 18 are views of a magnet according to some exemplary embodiments. FIGS. 19 and 20 are views showing a method of vibrating a display panel according to some exemplary embodiments.

Referring to FIGS. 17 and 18, in some exemplary embodiments, the second magnet MS2_2 may include a planar coil portion CP. For example, the second magnet MS2_2 may include a base portion BP, a planar coil portion CP disposed on one surface of the base portion BP, and first and second terminals T1 and T2 connected to both ends of the planar coil portion CP.

The planar coil portion CP, which generates a magnetic field supplied through the first terminal Ti and the second terminal T2, may be formed of a coil spirally wound from the center of a substrate 20 toward the outside as shown in FIGS. 17 and 18. However, exemplary embodiments are not limited thereto, and the planar coil portion CP may be formed of a coil wound in a shape other than a spiral shape.

The planar coil portion CP may include copper, and may generate a magnetic field when a current I passes through the coil. For instance, as shown in FIG. 17, when a current I(in) is applied to the planar coil portion CP through the first terminal T1 and a current I(out) comes out through the second terminal T2, the second magnet MS2_2 may be in a first polar state. Here, in the first polar state, the upper portion of the second magnet MS2_2 may be an N pole and the lower portion thereof may be an S pole, and the current I applied to the first terminal T1 may be an AC current. Further, as shown in FIG. 18, when a current I(in) is applied to the planar coil portion CP through the second terminal T2 and a current I(out) comes out through the first terminal Ti, the second magnet MS2_2 may be in a second polar state. Here, in the second polar state, the upper portion of the second magnet MS2_2 may be an S pole and the lower portion thereof may be an N pole, and the current I applied to the second terminal T2 may be an AC current. Further, although not shown, when a current I is not applied to the planar coil portion CP, the second magnet MS2_2 may have polarity. The second magnet MS2_2 may further include a low pass filter (LPF). The low pass filter (LPF) may be configured such that a current I is applied to the planar coil portion CP only in the low frequency signal corresponding to a low-pitched sound among electrical voice signals. In some exemplary embodiments, the first terminal T1 and second terminal T2 of the second magnet MS2_2 may be electrically connected to the vibration driving circuit 340. Further, in some exemplary embodiments, the first terminal T1 and second terminal T2 of the second magnet MS2_2 may be electrically connected to the first electrode 512 and second electrode 513 of the vibration generator 510. As described above, when the second magnet MS2_2 includes the planar coil portion CP, there can be an advantage of switching polarity and an advantage of fabricating the second magnet MS2_2 in a thin shape.

In the description of FIGS. 17 and 18, the second magnet MS2_2 has been described as a reference, but some exemplary embodiments are not limited thereto. In some exemplary embodiments, the first magnet MS1 may include the planar coil portion CP, and each of the first magnet MS1 and the second magnet MS2_2 may include the planar coil portion CP.

FIGS. 19 and 20 are views showing a method of vibrating a display panel according to another exemplary embodiment. The exemplary embodiment of FIGS. 19 and 20 is different from the exemplary embodiment of FIGS. 15 and 16 in that the second magnet MS2_2 includes a planar coil portion to switch polarity. A description overlapping that of the exemplary embodiment of FIGS. 15 and 16 will be omitted, and differences will be mainly described.

Referring to FIGS. 10 and 19, when the vibration layer 511 contracts to transmit a force to the display panel 300 in a direction opposite to the third direction (Z-axis direction), a current I(in) can be applied through the first terminal T1 of the second magnet MS2_2 as shown in FIG. 17, and thus the upper portion (first polar state) of the second magnet MS2_2 may be an N pole, and the lower portion thereof may be an S pole. For instance, an attractive force AF may be generated between the first magnet MS1 and the second magnet MS2_2 to increase a force transmitted to the display panel 300 in a direction opposite to the third direction (Z-axis direction).

Referring to FIG. 20, when the vibration layer 511 contracts to transmit a force to the display panel 300 in the third direction (Z-axis direction), a current I(in) can be applied through the second terminal T2 of the second magnet MS2_2 as shown in FIG. 18, and thus the upper portion (second polar state) of the second magnet MS2_2 may be an S pole, and the lower portion thereof may be an N pole. For instance, a repulsive force RF may be generated between the first magnet MS1 and the second magnet MS2_2 to increase a force transmitted to the display panel 300 in the third direction (Z-axis direction). As described above, when the second magnet MS2_2 is switched in accordance with the vibration of the vibration generator 510 to apply an attractive force and a repulsive force, the vibration of the vibration generator 510 may be effectively transmitted to the display panel 300 to improve the sound output of the display device 10.

Figure 21:
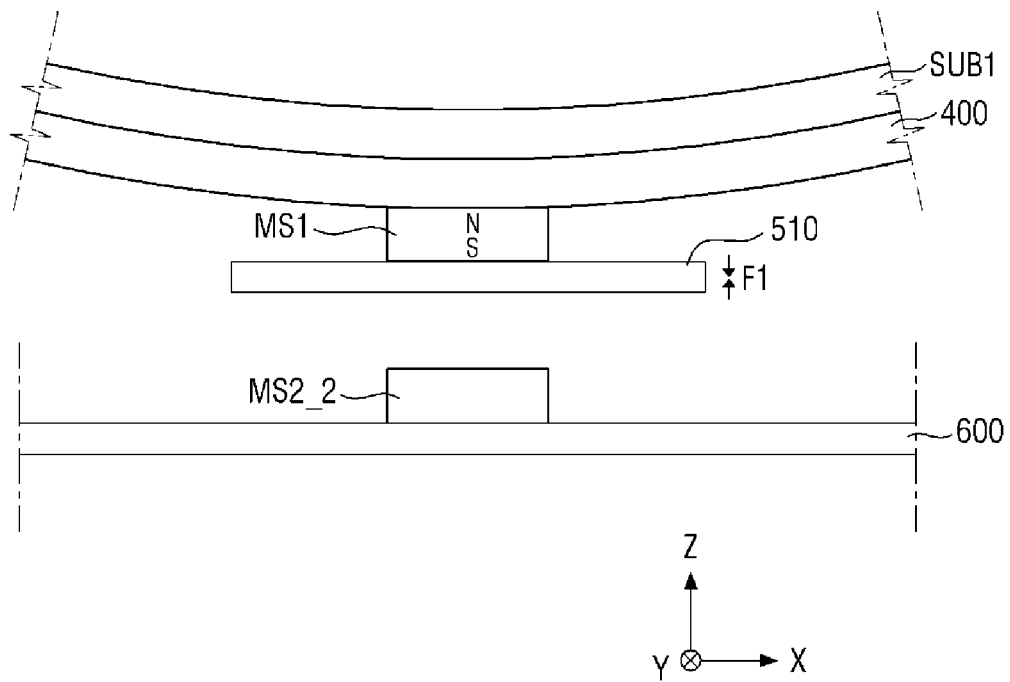
FIGS. 21 and 22 are views showing a method of vibrating a display panel according to some exemplary embodiments.
Figure 22:
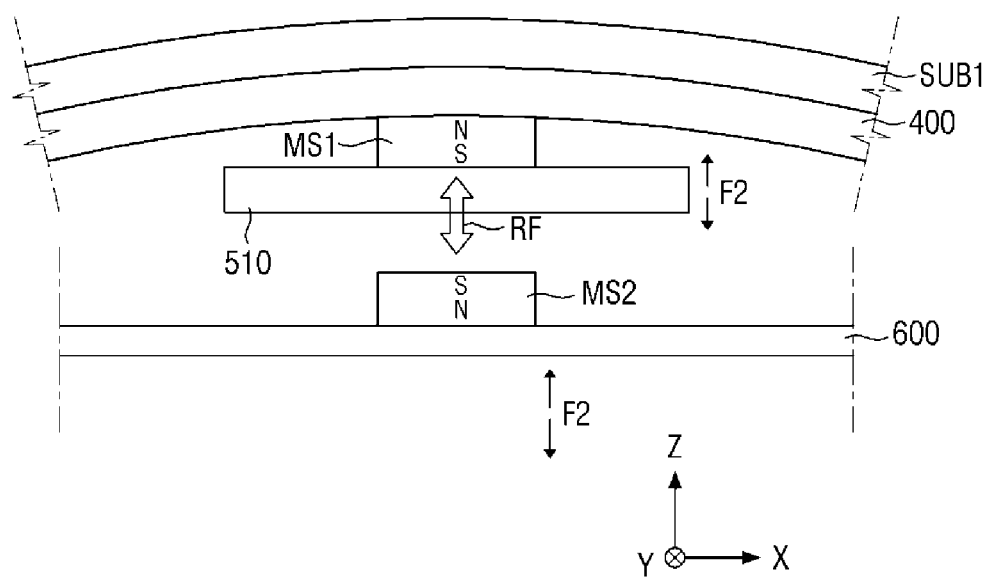

FIGS. 21 and 22 are views showing a method of vibrating a display panel according to some exemplary embodiments. The exemplary embodiment of FIGS. 21 and 22 is different from the exemplary embodiment of FIGS. 19 and 20 in that the second magnet MS2_2 does not have polarity. A description overlapping that of the exemplary embodiment of FIGS. 19 and 20 will be omitted, and differences will be mainly described.

Referring to FIG. 21, when the vibration layer 511 contracts to transmit a force to the display panel 300 in a direction opposite to the third direction (Z-axis direction), a current I(in) may not be applied to the second magnet MS2_2, and the second magnet MS2_2 may not have polarity.

Referring to FIG. 22, when the vibration layer 511 contracts to transmit a force to the display panel 300 in the third direction (Z-axis direction), a current I(in) may be applied through the second terminal T2 of the second magnet MS2_2, and thus the upper portion of the second magnet MS2_2 may be an S pole, and the lower portion thereof may be an N pole having polarity. For instance, a repulsive force RF may be generated between the first magnet MS1 and the second magnet MS2 to increase a force transmitted to the display panel 300 in the third direction (Z-axis direction). Although not shown, in some exemplary embodiments, when the vibration layer 511 contracts to transmit a force to the display panel 300 in a direction opposite to the third direction (Z-axis direction), a current I(in) may be applied through the first terminal T1 of the second magnet MS2_2, and thus the upper portion (first polar state) of the second magnet MS2_2 may be an N pole, and the lower portion thereof may be an S pole having polarity, and when the vibration layer 511 contracts to transmit a force to the display panel 300 in the third direction (Z-axis direction), a current I(in) may not be applied to the second magnet MS2_2, and the second magnet MS2_2 may not have polarity.

Figure 23:
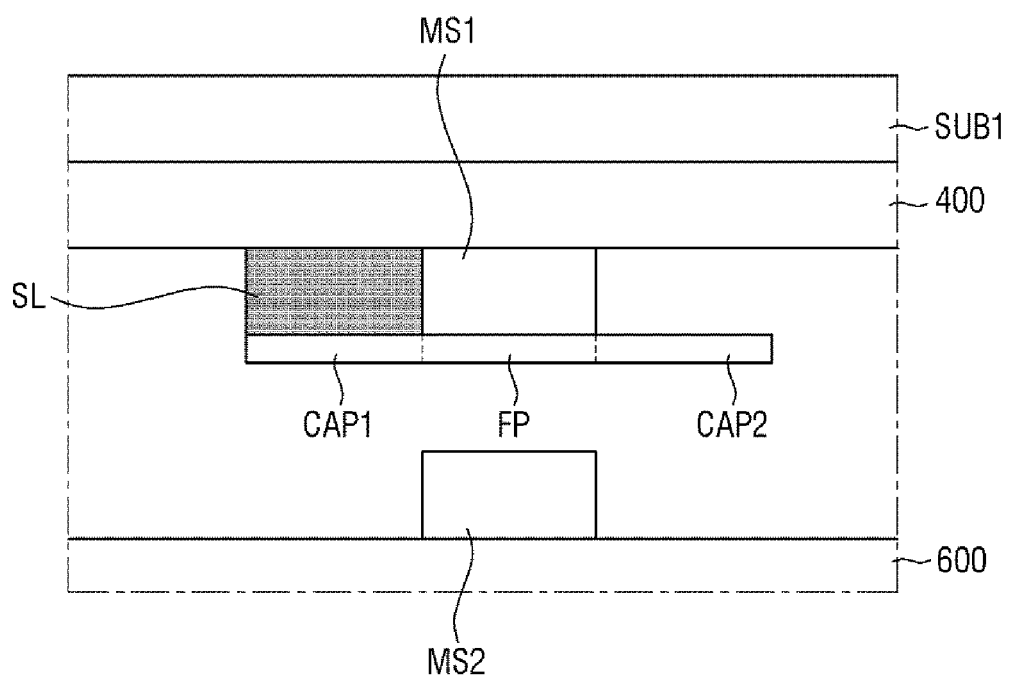
FIG. 23 is an enlarged cross-sectional view of area A of FIG. 6 according to some exemplary embodiments.
Figure 24:
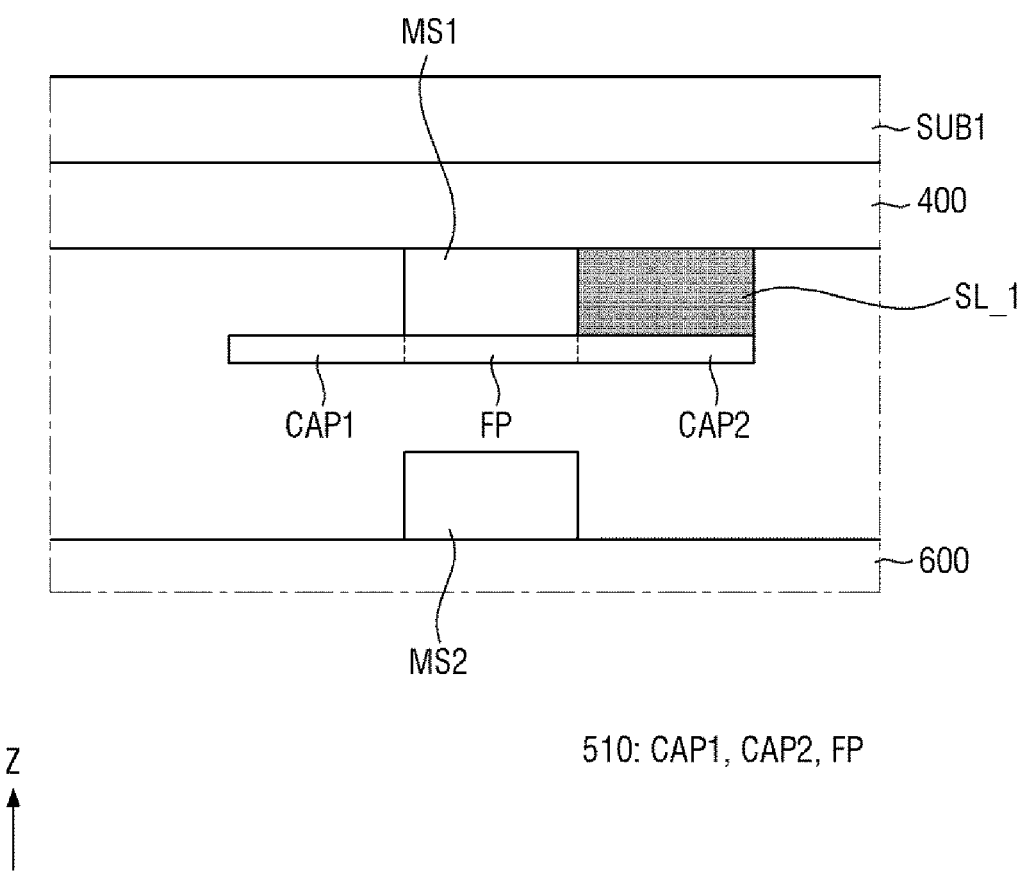
FIG. 24 is an enlarged cross-sectional view of area A of FIG. 6 according to some exemplary embodiments.
Figure 25:
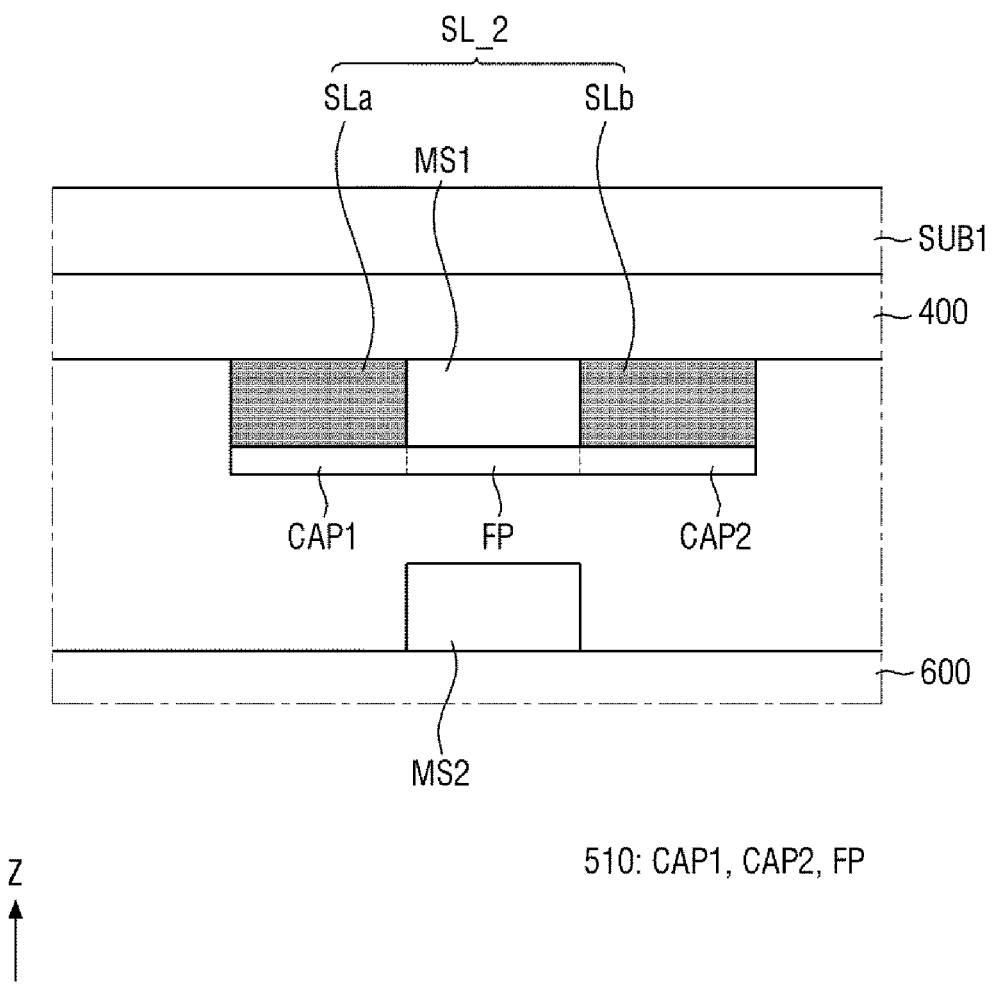
FIG. 25 is an enlarged cross-sectional view of area A of FIG. 6 according to some exemplary embodiments.

FIG. 23 is an enlarged cross-sectional view of area A of FIG. 6 according to some exemplary embodiments. FIG. 24 is an enlarged cross-sectional view of area A of FIG. 6 according to some exemplary embodiments. FIG. 25 is an enlarged cross-sectional view of area A of FIG. 6 according to some exemplary embodiments.

The exemplary embodiment of FIGS. 23 to 25 is different from the exemplary embodiment of FIG. 9 in that a support layer may be disposed between the panel lower member and the vibration generator 510. A description overlapping that of the exemplary embodiment of FIG. 9 will be omitted, and differences will be mainly described.

Referring to FIG. 23, the vibration generator 510 may include a fixed portion FP attached and fixed to the first magnet MS1, a first cantilever portion CAP1 may be disposed at one side of the fixed portion FP, and a second cantilever portion CAP2 may be disposed at the other side of the fixed portion FP. A support layer SL may be disposed between the first cantilever portion CAP1 and the panel lower member 400. In some exemplary embodiments, the upper surface of the support layer SL may be in contact with the lower panel member 400, and the lower surface of the support layer SL may be in contact with the first cantilever portion CAP1. However, some exemplary embodiments are not limited thereto. In some exemplary embodiments, the upper surface of the support layer SL may be in contact with the panel lower member 400, and the lower surface of the support layer SL may not be in contact with the first cantilever portion CAP1. Further, in some exemplary embodiments, the upper surface of the support layer SL may not be in contact with the panel lower member 400, and the lower surface of the support layer SL may be in contact the first cantilever portion CAP1.

In some exemplary embodiments, the end of the support layer SL and the end of the first cantilever portion CAP1 may be aligned in the third direction (Z-axis direction). However, some exemplary embodiments are not limited thereto. In some exemplary embodiments, the end of the support layer SL and the end of the first cantilever portion CAP1 may not be aligned. For example, the end of the support layer SL may be disposed inside the end of the first cantilever portion CAP1, and the end of the support layer SL may protrude from the end of the first cantilever portion CAP1 in a direction opposite to the first direction (X-axis direction).

The rigidity of the support layer SL and the rigidity of the first magnet MS1 may be different from each other. For instance, the rigidity of the support layer SL may be smaller than the rigidity of the first magnet MS1. In some exemplary embodiments, the rigidity of the support layer SL may be negligibly low. For instance, the support layer SL may not transmit the vibration of the vibration generator 510 to the display panel 300, and the vibration of the vibration generator 510 may be concentrated on the first magnet MS1. As described above, when the support layer SL is disposed between the first cantilever portion CAP1 and the panel lower member 400, there can be advantages that a low-frequency band may be amplified to improve the output of a sound of the low-frequency band and that the damage and breakage of the vibration generator 510 may be prevented.

In some exemplary embodiments, as shown in FIG. 24, a support layer SL_1 may be disposed between the second cantilever portion CAP2 and the panel lower member 400. In some exemplary embodiments, as shown in FIG. 25, a support layer SL_2 may include a first support layer SLa disposed between the first cantilever portion CAP1 and the panel lower member 400 and a second support layer SLb may be disposed between the second cantilevered portion CAP2 and the panel lower member 400.

Figure 26:
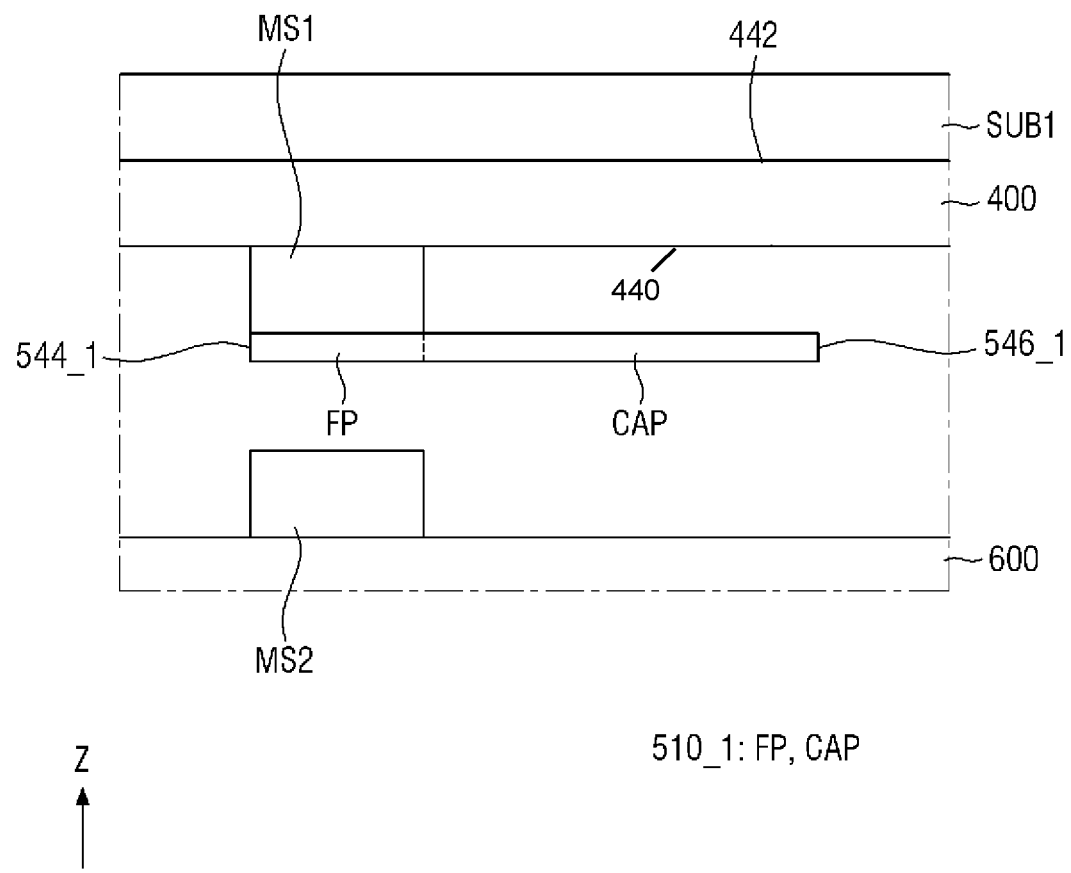
FIG. 26 is an enlarged cross-sectional view of area A of FIG. 6 according to some exemplary embodiments.
Figure 27:
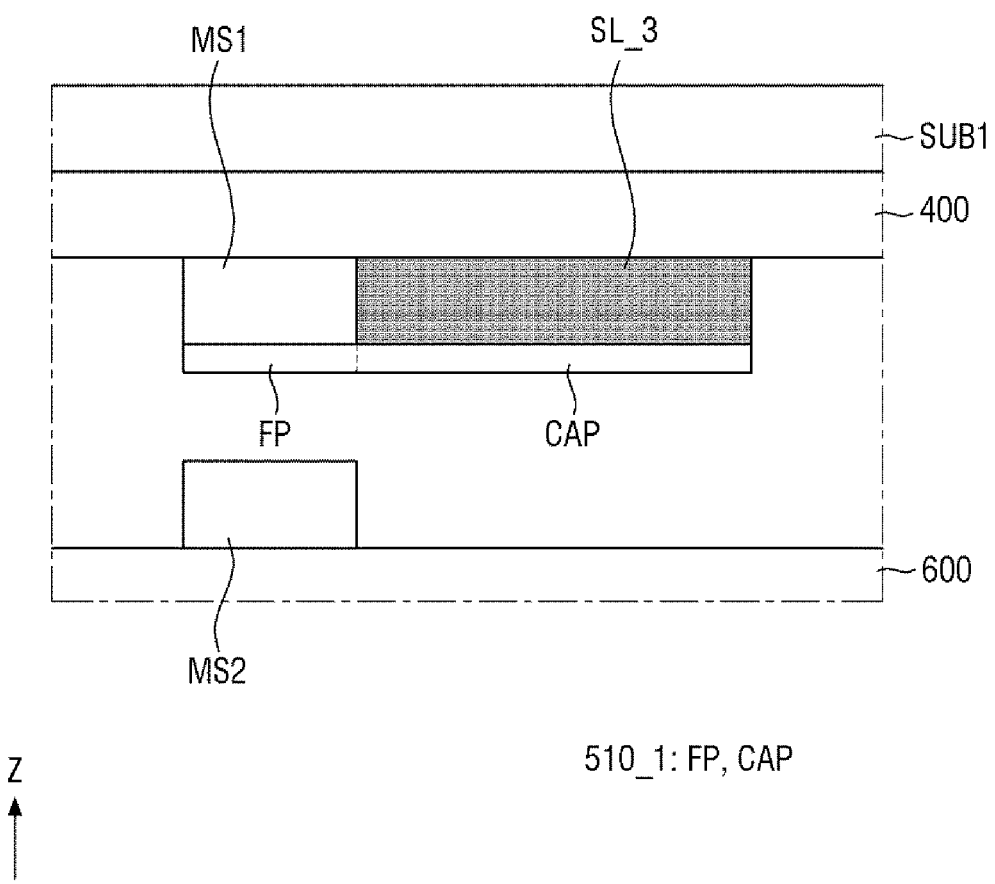
FIG. 27 is an enlarged cross-sectional view of area A of FIG. 6 according to some exemplary embodiments.

FIG. 26 is an enlarged cross-sectional view of area A of FIG. 6 according to some exemplary embodiments. FIG. 27 is an enlarged cross-sectional view of area A of FIG. 6 according to some exemplary embodiments. The exemplary embodiment of FIGS. 26 and 27 is different from the exemplary embodiment of FIG. 9 in that the first magnet and the second magnet are aligned on one side of the vibration generator 510_1. A description overlapping that of the exemplary embodiment of FIG. 9 will be omitted, and differences will be mainly described.

Referring to FIG. 26, the first surface 521 of the first magnet MS1 may be attached and fixed to a lower surface 440 of the panel lower member 400, which may be attached at an upper surface 442 via an adhesive member, and the second surface 522 of the first magnet MS1, opposite to the first surface 521 of the first magnet MS1, may be attached and fixed to the upper surface 540 of the vibration generator 510_1 via an adhesive member. One side surface 524 of the first magnet MS1 and one side surface 544_1 of the vibration generator 510_1 may be aligned in the third direction (Z-axis direction). However, some exemplary embodiments are not limited thereto. In some exemplary embodiments, the first magnet MS1 may be positioned at an end in a direction opposite to the first direction (X-axis direction) to be attached and fixed to the upper surface 540 of the vibration generator 510_1, and one side surface 526 of the first magnet MS1 and one side surface 546_1 of the vibration generator 510_1 may not be aligned in the third direction (Z-axis direction).

The vibration generator 510_1 may include a fixed portion FP attached and fixed to the first magnet MS1 and a cantilever portion CAP disposed on the other side of the fixed portion FP. The cantilever portion CAP may be spaced apart from the panel lower member 400. The flexible circuit board 520 may be disposed at one side surface 544_1 of the lower surface 542 of the vibration generator 510_1. The electrodes of the vibration generator 510 may be electrically connected to the pads of the pad portion of the other end of the flexible circuit board 520 at one side surface 546_1 of the vibration generator 510_1.

The second magnet MS2 may be attached and fixed to the upper surface of the middle frame 600 via an adhesive member. The second magnet MS2 may overlap the first magnet MS1 in the third direction (Z-axis direction) which is a thickness direction. Further, the second magnet MS2 may overlap the fixed portion FP of the vibration generator 510_1 in the third direction (Z-axis direction), and the second magnet MS2 and the vibration generator 510_1 may be spaced apart from each other in the third direction (Z-axis direction).

Referring to FIG. 27, in some exemplary embodiments, a support layer SL_3 may be disposed between the cantilever portion CAP of the vibration generator 510_1 and the panel lower member 400. Since the support layer SL_3 has already been described above, a redundant description will be omitted.

Figure 28:
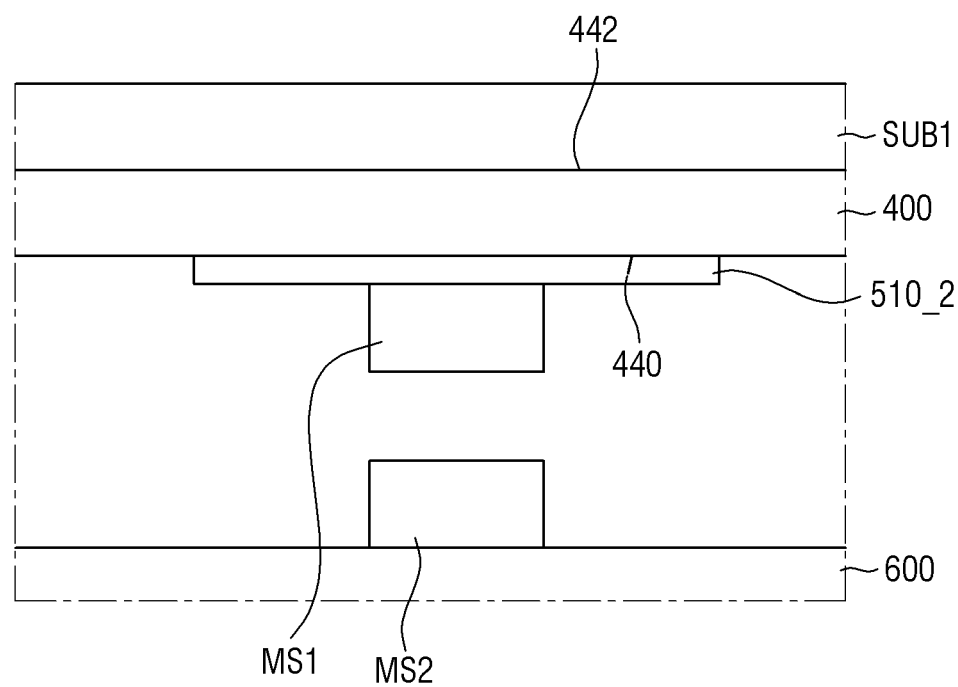
FIG. 28 is an enlarged cross-sectional view of area A of FIG. 6 according to some exemplary embodiments.
Figure 29:
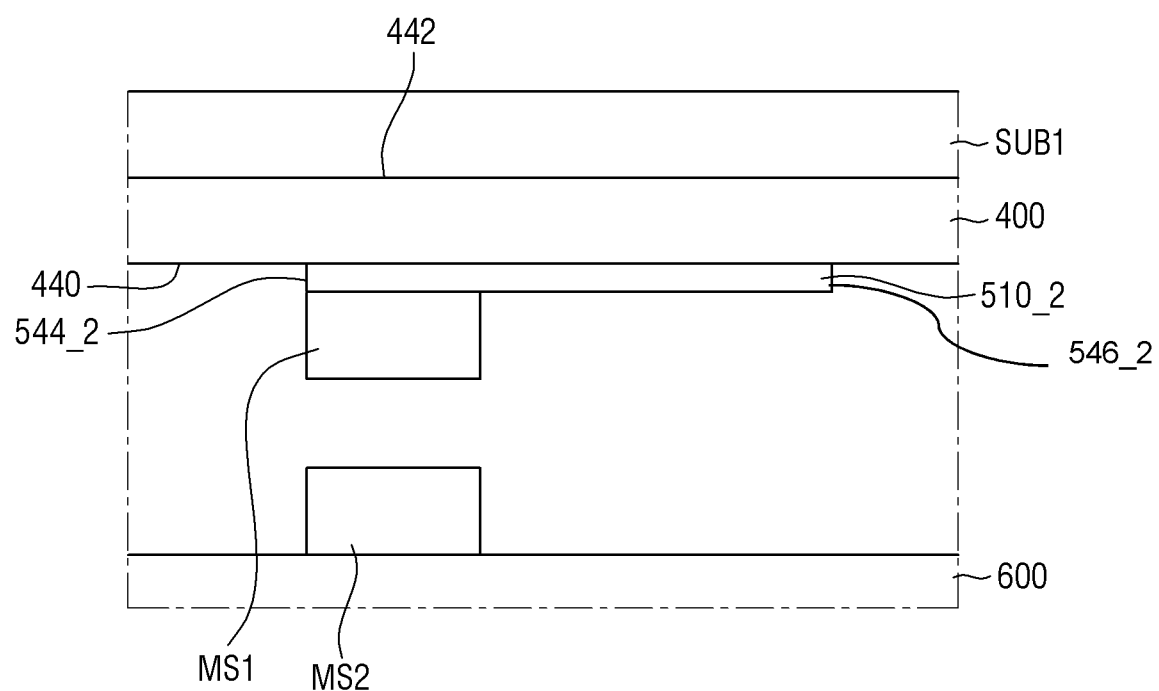
FIG. 29 is an enlarged cross-sectional view of area A of FIG. 6 according to some exemplary embodiments.
Figure 30:
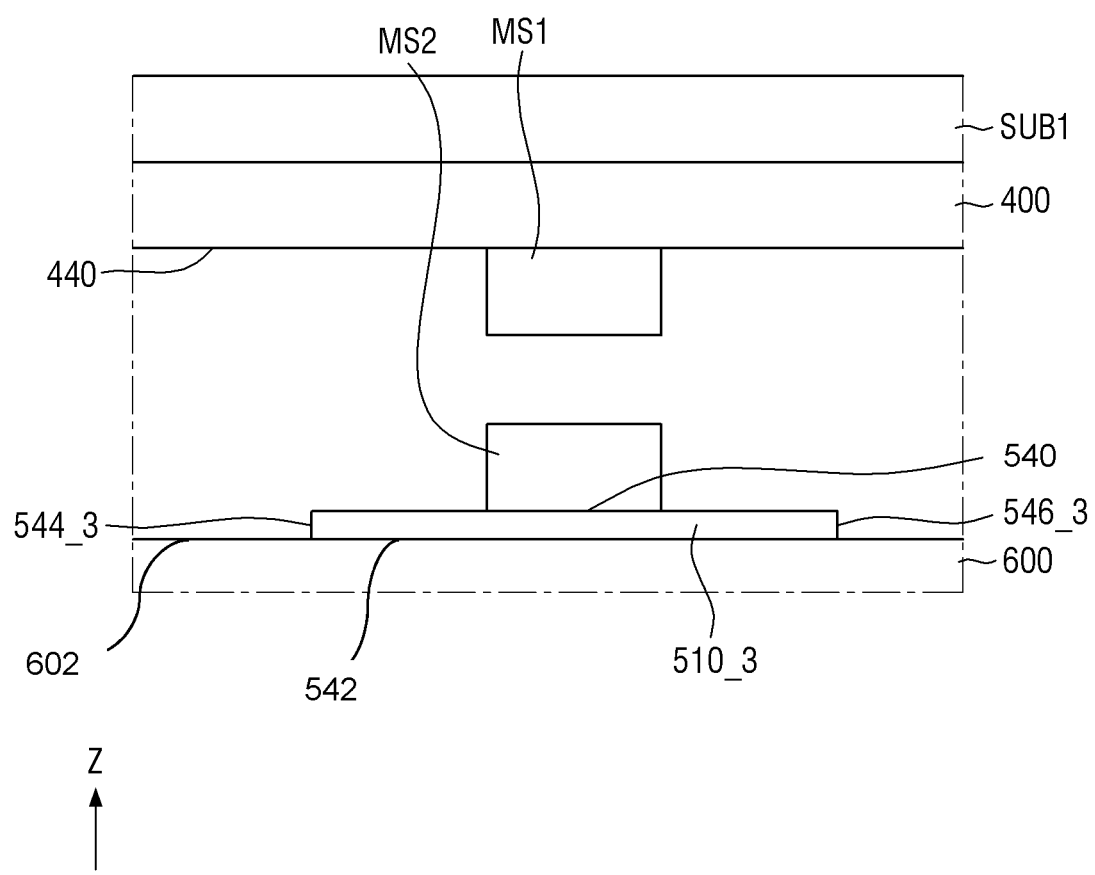
FIG. 30 is an enlarged cross-sectional view of area A of FIG. 6 according to some exemplary embodiments.
Figure 31:
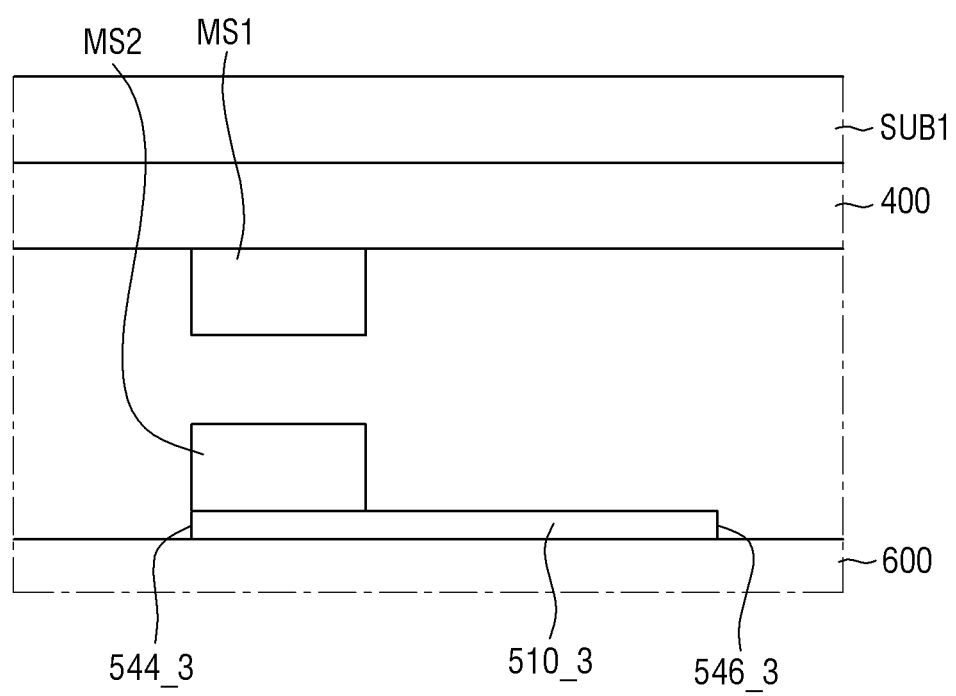
FIG. 31 is an enlarged cross-sectional view of area A of FIG. 6 according to some exemplary embodiments.

FIG. 28 is an enlarged cross-sectional view of area A of FIG. 6 according to some exemplary embodiments. FIG. 29 is an enlarged cross-sectional view of area A of FIG. 6 according to some exemplary embodiments. FIG. 30 is an enlarged cross-sectional view of area A of FIG. 6 according to some exemplary embodiments. FIG. 31 is an enlarged cross-sectional view of area A of FIG. 6 according to some exemplary embodiments.

The exemplary embodiment of FIGS. 28 to 31 is different from the exemplary embodiment of FIG. 9 in that the vibration generator does not include a cantilever portion. A description overlapping that of the exemplary embodiment of FIG. 9 will be omitted, and differences will be mainly described.

Referring to FIG. 28, the vibration generator 510_2 may be disposed on the lower surface 440 of the panel lower member 400. For instance, the upper surface 540 of the vibration generator 510_2 may be attached and fixed to the lower surface 440 of the panel lower member 400 via an adhesive member.

The first magnet MS1 may be disposed on the lower surface 542 of the vibration generator 510_2. For instance, the upper surface 521 of the first magnet MS1 may be attached and fixed to the center portion of the lower surface 542 of the vibration generator 510_2 via an adhesive member.

The second magnet MS2 may be disposed on the upper surface of the middle frame 600. For instance, the lower surface 530 of the second magnet MS2 may be attached and fixed to the upper surface of the middle frame 600 via an adhesive member.

The first magnet MS1 and the second magnet MS2 may overlap each other in the third direction (Z-axis direction), and may be spaced apart from each other in the third direction (Z-axis direction). As described above, the first magnet MS1 and the second magnet MS2 can improve the vibration of the display panel 300 through a magnetic field.

Referring to FIG. 29, in some exemplary embodiments, the first magnet MS1 may be disposed on the lower surface 542 of the vibration generator 510_2. For instance, the upper surface 521 of the first magnet MS1 may be attached and fixed to one side of the lower surface 542 of the vibration generator 510_2 via an adhesive member, and the second magnet MS2 may overlap the first magnet MS1 in the third direction (Z-axis direction) and may be attached and fixed to the upper surface 602 of the middle frame 600. The first magnet MS1 and the second magnet MS2 may be spaced apart from each other in the third direction (Z-axis direction), and the side surfaces 544_2 and 56_2 of the vibration generator 510_2, the first magnet MS1 and the second magnet MS2 may be aligned in the third direction (Z-axis direction). As described above, the first magnet MS1 and the second magnet MS2 can improve the vibration of the display panel 300 through a magnetic field.

Referring to FIG. 30, in some exemplary embodiments, the vibration generator 510_3 may be disposed on the upper surface 602 of the middle frame 600. For instance, the lower surface 542 of the vibration generator 510_3 may be attached and fixed to the upper surface 602 of the middle frame 600 via an adhesive member.

The first magnet MS1 may be disposed on the lower surface 440 of the panel lower member 400. For instance, the upper surface 521 of the first magnet MS1 may be attached and fixed to the lower surface 440 of the panel lower member 400 via an adhesive member.

The second magnet MS2 may be disposed on the upper surface 540 of the vibration generator 510_3. For instance, the lower surface 530 of the second magnet MS2 may be attached and fixed to the center portion of the upper surface 540 of the vibration generator 510_3 via an adhesive member.

The first magnet MS1 and the second magnet MS2 may overlap each other in the third direction (Z-axis direction), and may be spaced apart from each other in the third direction (Z-axis direction). The vibration of the vibration generator 510_3 may concentrated on the second magnet MS2, and the first magnet MS1 may be vibrated by a magnetic field between the second magnet MS2 and the first magnet MS1. For instance, a repulsive force may be generated between the second magnet MS2 and the first magnet MS1, and the first magnet MS1 may generate sound by vibrating the display panel 300 by the vibration of the second magnet MS2.

In some exemplary embodiments, as shown in FIG. 31, the first magnet MS1 and the second magnet MS2 may be disposed at one side surface 544_3 of the vibration generator 510_3. For instance, the first magnet MS1 and the second magnet MS2 may be disposed at one side 544_3 of the vibration generator 510_3 in a direction opposite to the first direction (X-axis direction). Further, the side surfaces 544_3 and 546_3 of the vibration generator 510_2, the first magnet MS1 and the second magnet MS2 may be aligned in the third direction (Z-axis direction). However, some exemplary embodiments are not limited thereto. In some exemplary embodiments, the first magnet MS1 and the second magnet MS2 may be disposed to be positioned at one side 544_3 or the other side 546_3 of the vibration generator 510_3, and at least one side surface 546_3 of the vibration generator 510_2 may not be aligned with the side surfaces 524, 526, 534, and 536 of the first magnet MS1 and the second magnet MS2 in the third direction (Z-axis direction).

Figure 32:
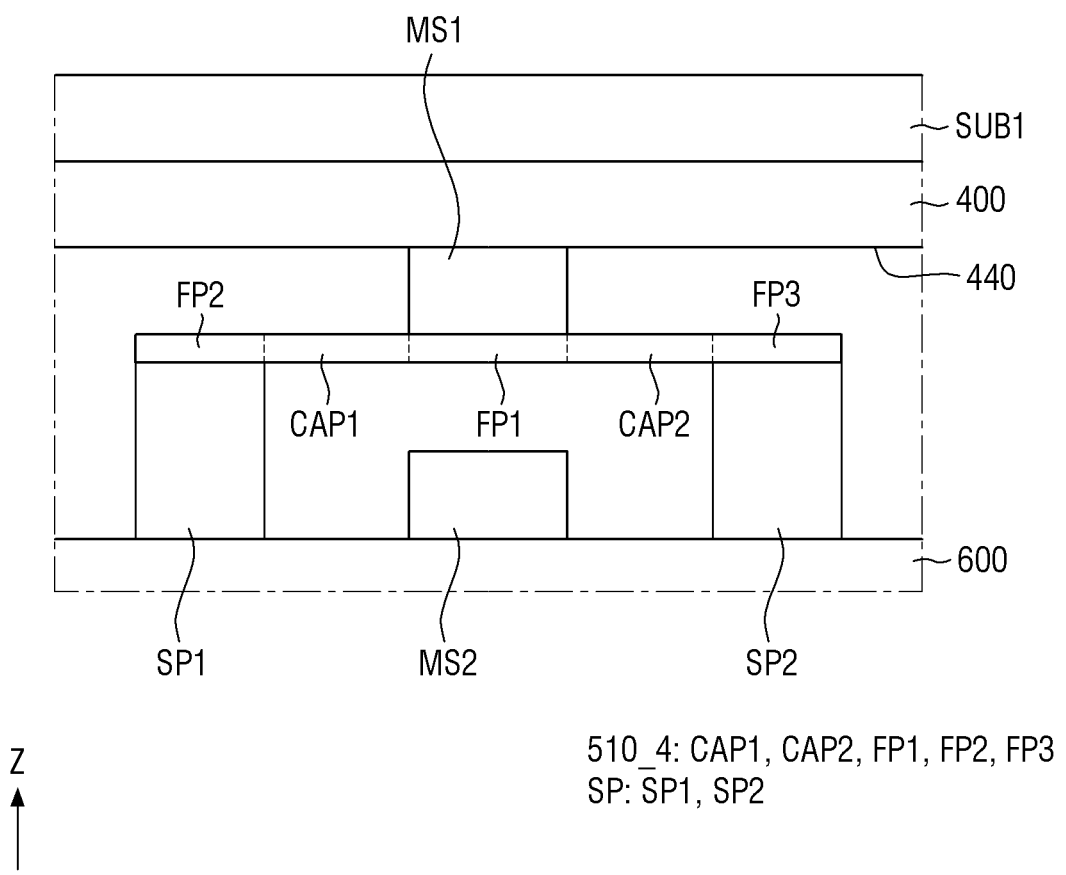
FIG. 32 is an enlarged cross-sectional view of area A of FIG. 6 according to some exemplary embodiments.
Figure 33:
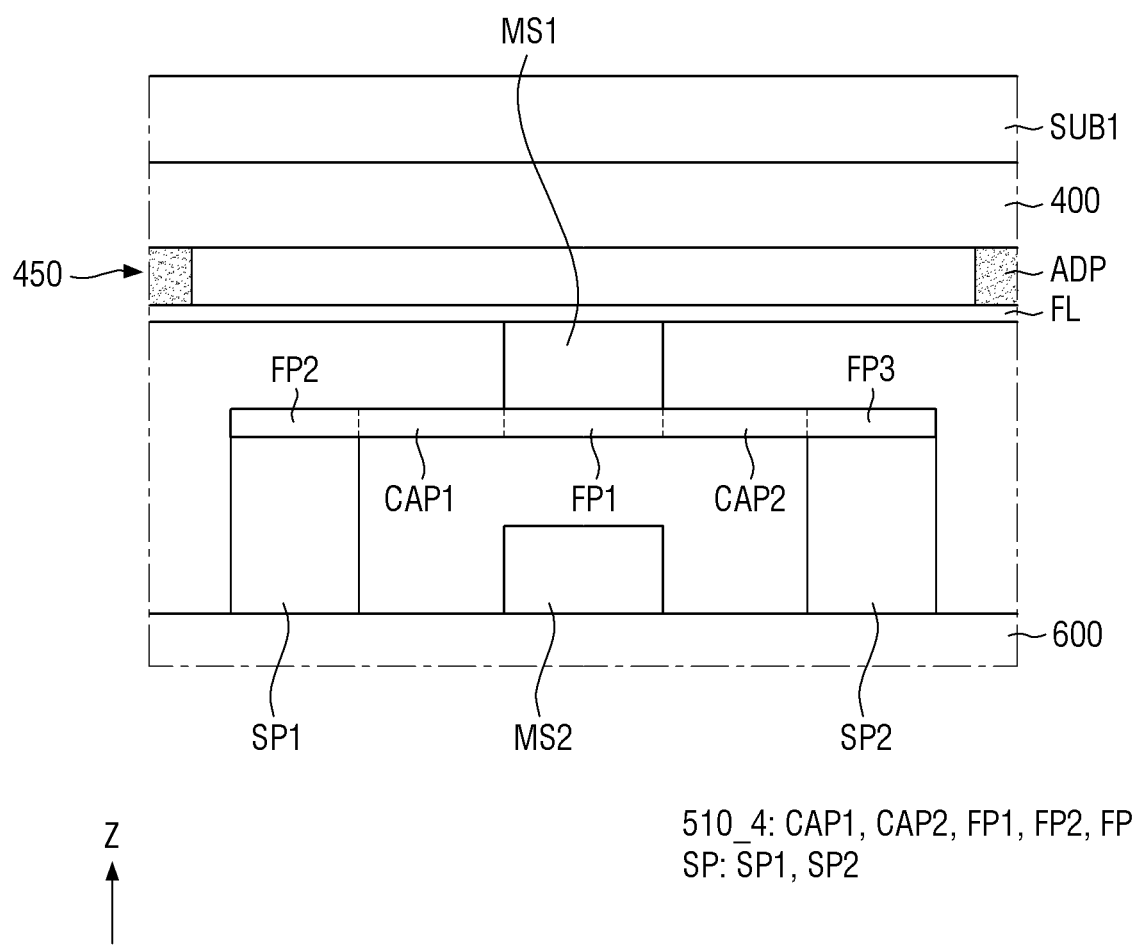
FIG. 33 is an enlarged cross-sectional view of area A of FIG. 6 according to some exemplary embodiments.
Figure 34:
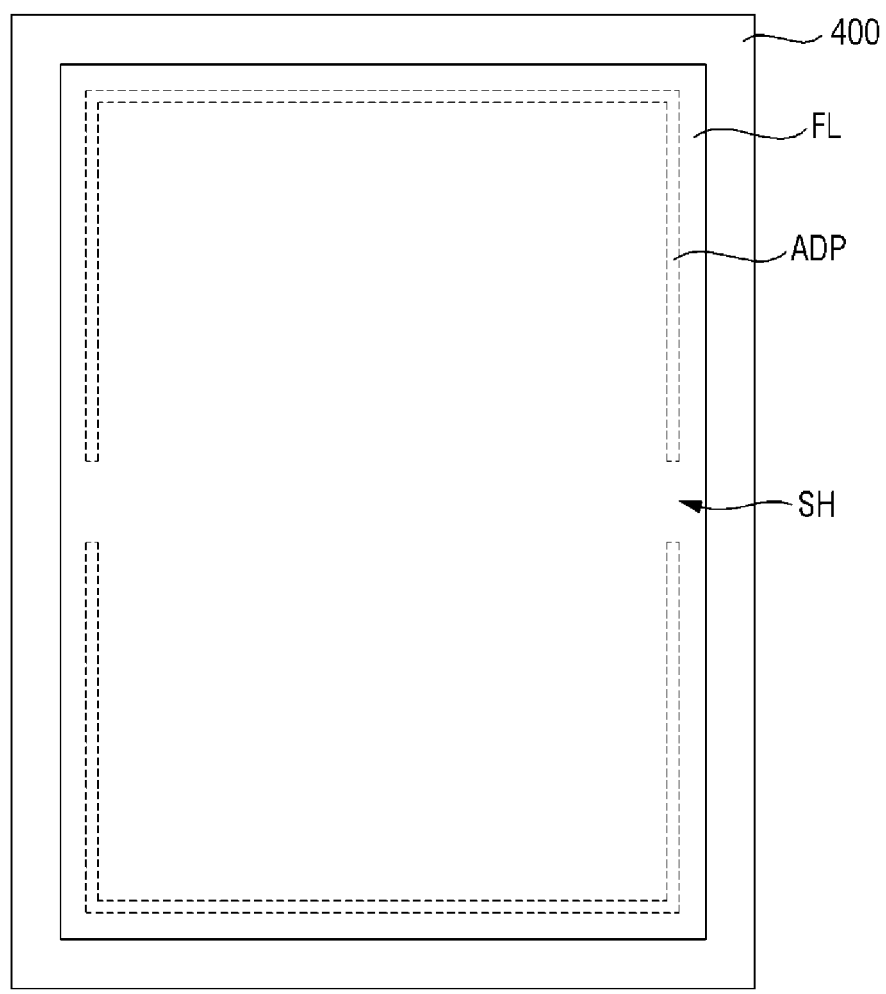
FIG. 34 is a view of an arrangement of an adhesive portion disposed between a display panel and film layer in an embodiment of FIG. 33 according to some exemplary embodiments.
Figure 35:
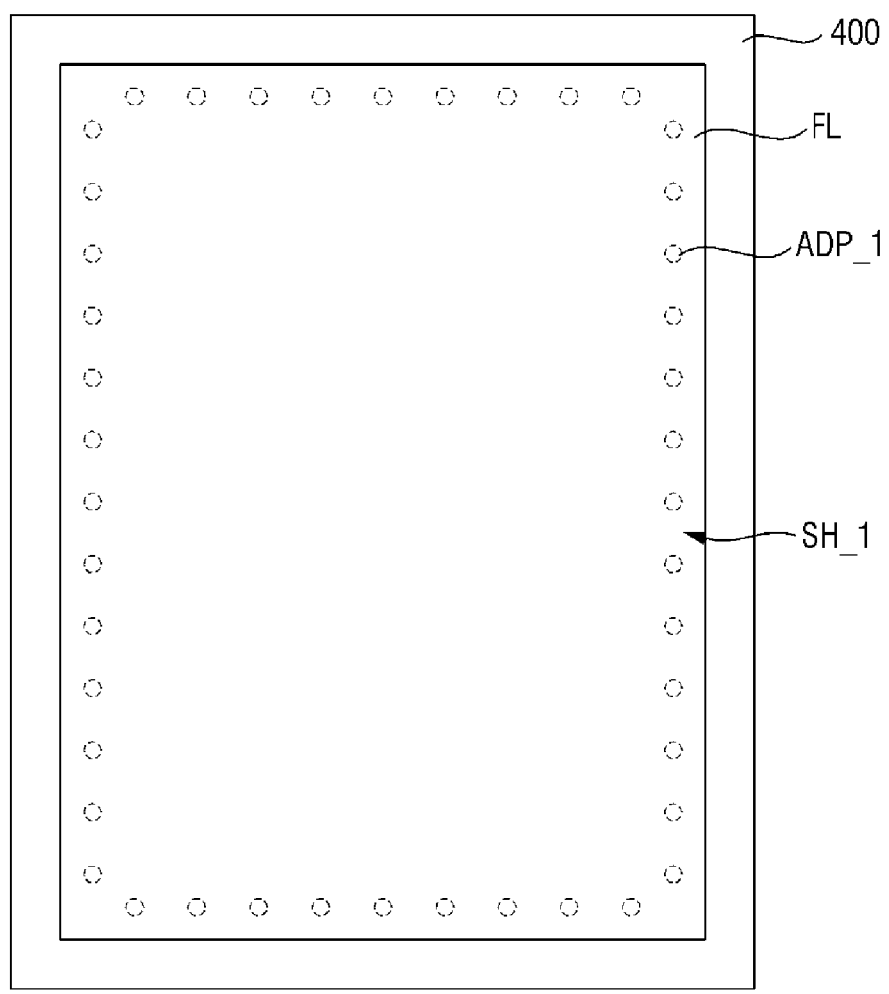
FIG. 35 is a view of an arrangement of an adhesive portion disposed between a display panel and film layer in another exemplary embodiment of FIG. 33 according to some exemplary embodiments.

FIG. 32 is an enlarged cross-sectional view of area A of FIG. 6 according to some exemplary embodiments. FIG. 33 is an enlarged cross-sectional view of area A of FIG. 6 according to some exemplary embodiments. FIG. 34 is a view of an arrangement of an adhesive portion disposed between a display panel and film layer in an embodiment of FIG. 33 according to some exemplary embodiments. FIG. 35 is a view of an arrangement of an adhesive portion disposed between a display panel and film layer in another exemplary embodiment of FIG. 33 according to some exemplary embodiments.

The exemplary embodiments of FIGS. 32 to 35 are different from the exemplary embodiment of FIG. 9 in that support portions SP1 and SP2 are disposed between the vibration generator 500_4 and the middle frame 600 and in that a film layer is disposed between the first magnet MS1 and the lower panel member 400. A description overlapping that of the exemplary embodiment of FIG. 9 will be omitted, and differences will be mainly described.

Referring to FIG. 32, in some exemplary embodiments, a first support portion SP1 and a second support portion SP2 may be disposed on the middle frame 600. A second magnet MS2 may be disposed between the first support portion SP1 and the second support portion SP2, and a first magnet MS1 may be disposed on the lower surface 440 of the panel lower member 400.

The lower surfaces of the first support portion SP1 and the second support portion SP2 may be attached and fixed to the middle frame 600, and the lower surfaces of the first support portion SP1 and the second support portion SP2 may be attached and fixed to the vibration generator 500_4. For instance, the first support portion SP1 and the second support portion SP2 may be spaced apart from each other in the first direction (X-axis direction), and may be attached and fixed to one side edge and the other side edge of the vibration generator 500_4. In some exemplary embodiments, one side surface of the first support portion SP1 may be aligned with one side surface of the vibration generator 500_4 in the third direction (Z-axis direction), and one side surface of the second support portion SP2 may be aligned with the other side surface of the vibration generator 500_4 in the third direction (Z-axis direction).

The height of each of the first support portion SP1 and the second support portion SP2 in the third direction (Z-axis direction) may be higher than the height of the second magnet MS2 in the third direction (Z-axis direction).

Each of the first support portion SP1 and the second support portion SP2 may be made of at least one of a stainless steel, a glass, a metal, or the like. However, the material thereof is not limited thereto.

The vibration generator 510_4 may include a first fixed portion FP1 attached and fixed to the first magnet MS1, a second fixed portion FP2 may be attached and fixed to the first support portion SP1, a third fixed portion FP3 may be attached and fixed to the second support portion SP2, a first cantilever portion CAP1 may be disposed between the first fixed portion FP1 and the second fixed portion FP2, and a second cantilever portion CAP2 may be disposed between the first fixed portion FP1 and the third fixed portion FP3.

As described above, since the vibration generator 510_4 may include the second fixed portion FP2 attached and fixed to the first fixed portion FP1 and the third fixed portion FP3 attached and fixed to the second fixed portion FP2, there can be an advantage that vibration loss generated at one end and the other end of the vibration generator 510_4 can be prevented.

Referring to FIGS. 33 to 35, in some exemplary embodiments, a film layer FL may be further disposed between the panel lower member 400 and the first magnet MS1. For instance, the panel lower member 400 and the film layer FL may be spaced apart from each other in the third direction (in the Z-axis direction) with an adhesive portion ADP therebetween. As shown in FIG. 34, the adhesive portion ADP may be located adjacent to each side of the film layer FL in an area where the film layer FL can overlap the panel lower member 400, and may have a bar shape surrounding an edge 450 of the film layer FL. The adhesive portion ADP may include a sound hole SH through which a sound due to vibration is output to the outside. Referring to FIG. 35, in some exemplary embodiments, an adhesive portion ADP_1 may be located adjacent to each side of the film layer FL in an area where the film layer FL can overlap the panel lower member 400, and may have a dot shape surrounding the edge of the film layer FL. Further, sound holes SH_1 may be located between a plurality of dots of the adhesive portion ADP_1.

The film layer FL may serve as a diaphragm that may vibrate and generate sound by the first magnet MS1 and the vibration generator 510_4 disposed thereunder. For instance, the thickness of the film layer FL may be about 10 um to about 200 um, and the film layer FL may be made of a polymer resin such as at least one of a polyethylene, a polyimide, a polypropylene, or a polystyrene, or may be made of paper including a pulp or a fiber. However, some exemplary embodiments are not limited thereto.

Figure 36:
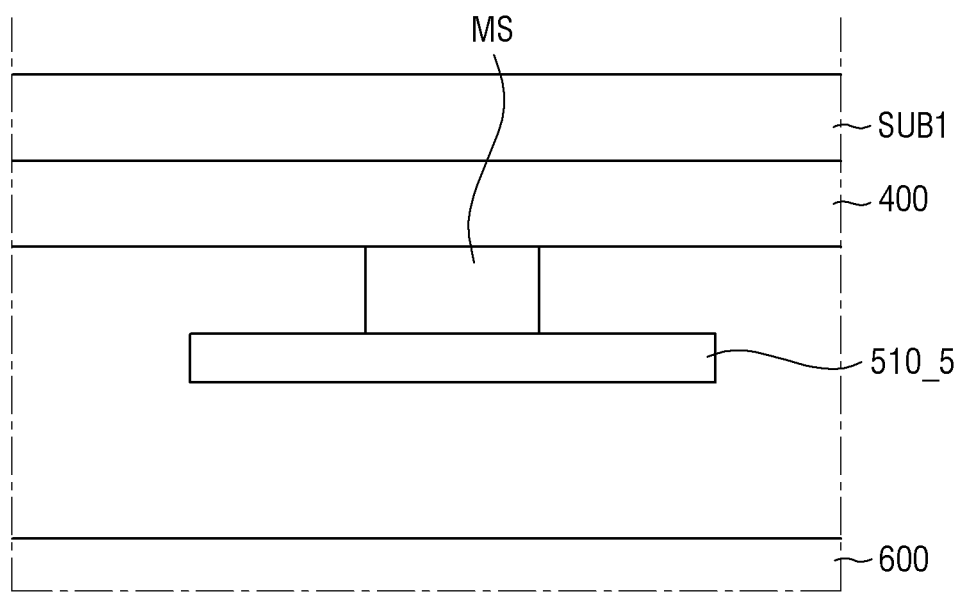
FIG. 36 is an enlarged cross-sectional view of area A of FIG. 6 according to some exemplary embodiments.
Figure 37:
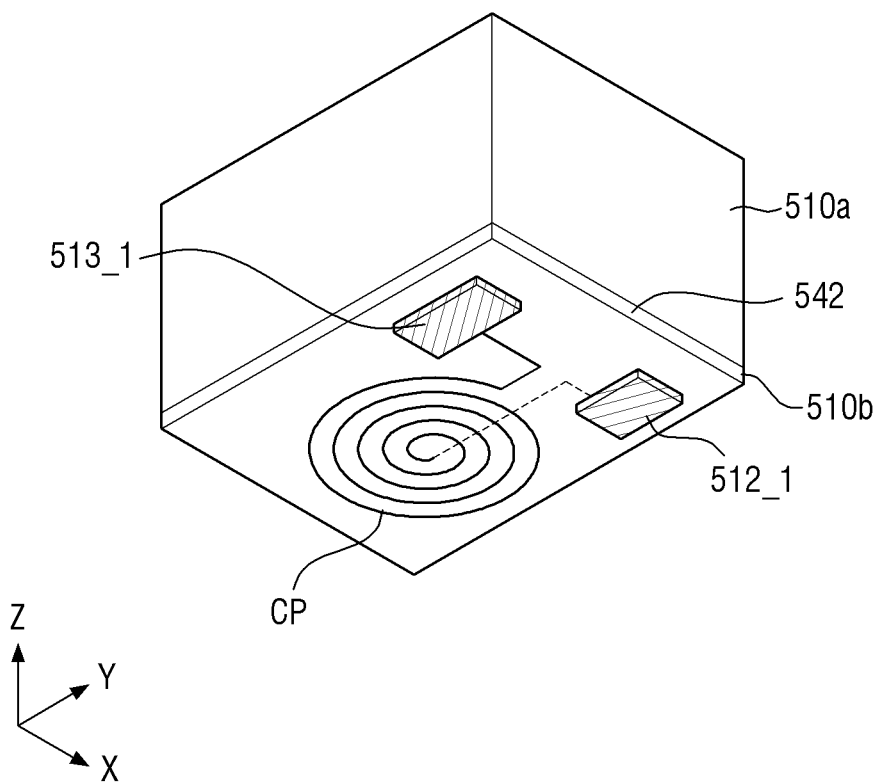
FIG. 37 is a perspective view of a vibration generator according to some exemplary embodiments.
Figure 38:
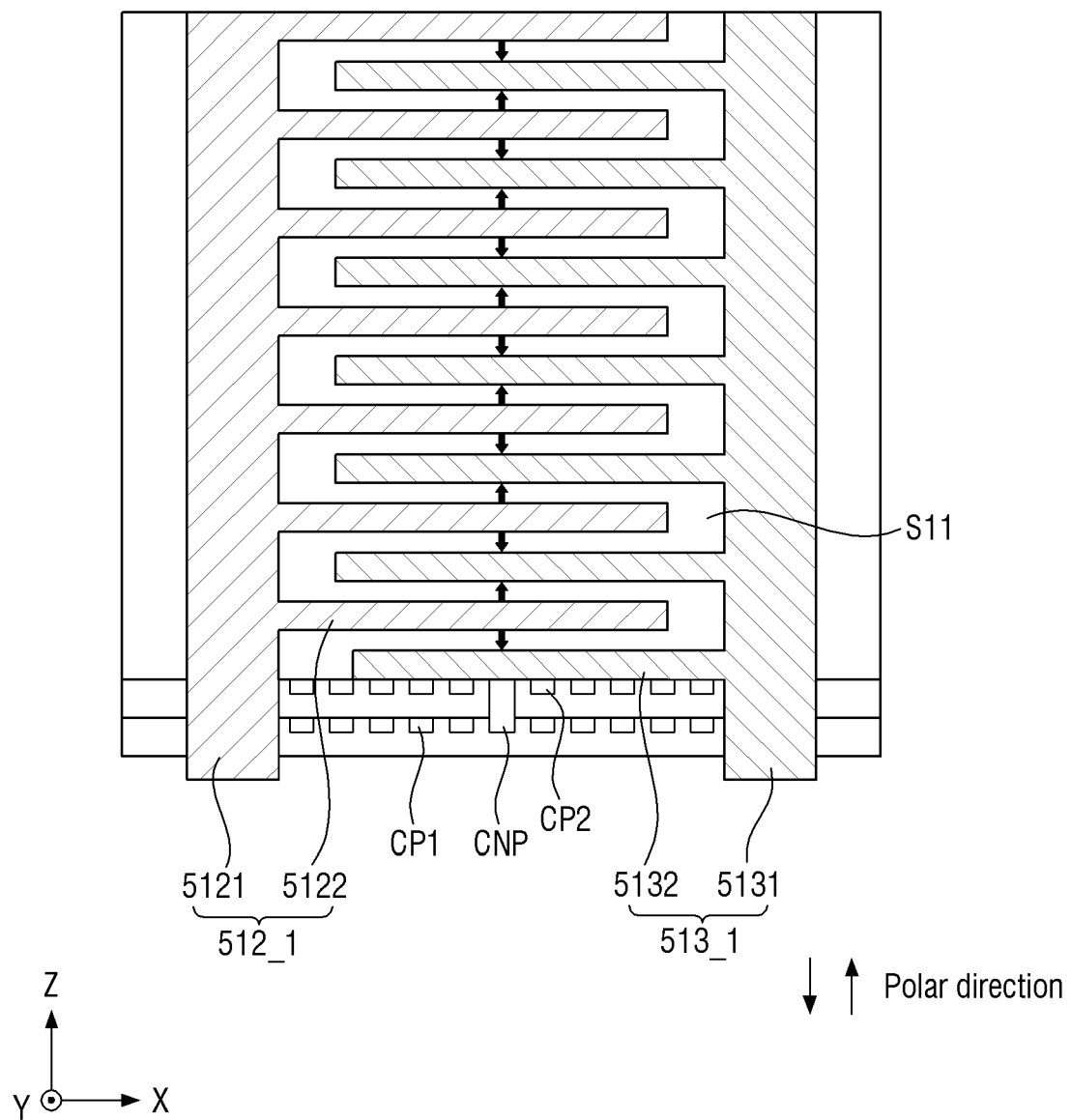
FIG. 38 is a cross-sectional view of a vibration generator according to some exemplary embodiments.
Figure 39:
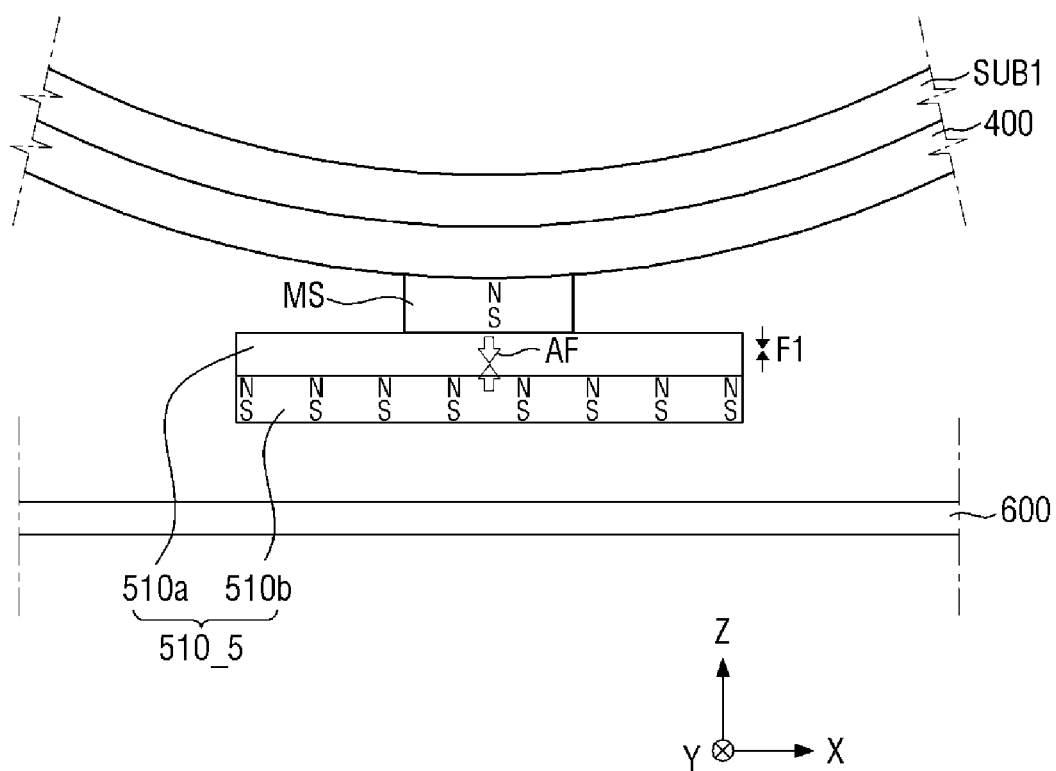
FIGS. 39 and 40 are views showing a method of vibrating a display panel according to some exemplary embodiments.
Figure 40:
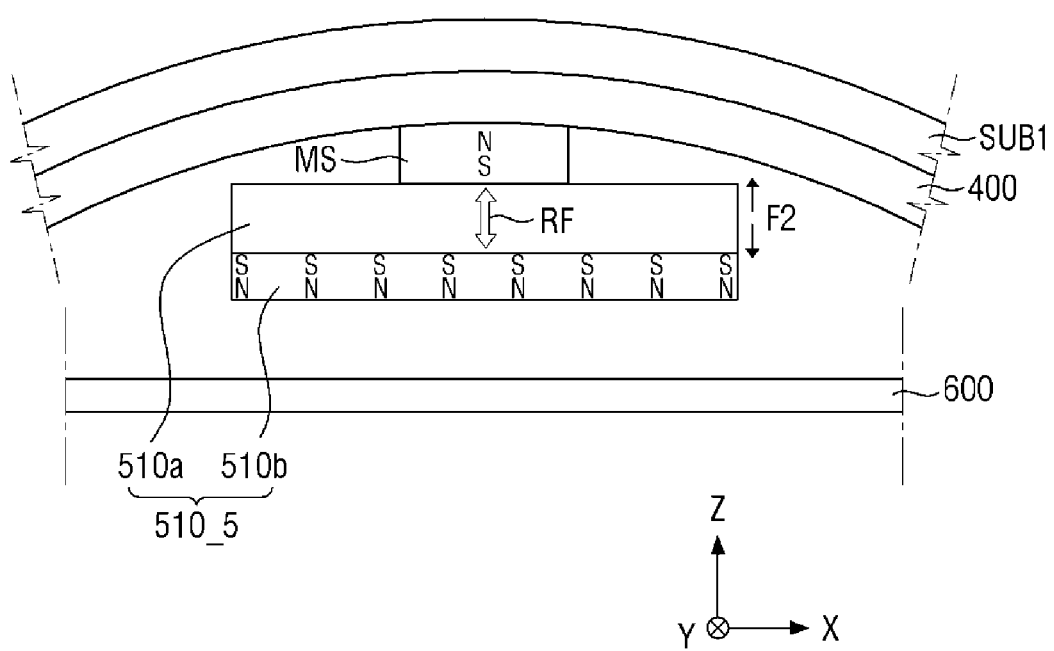

FIG. 36 is an enlarged cross-sectional view of area A of FIG. 6 according to some exemplary embodiments. FIG. 37 is a perspective view of a vibration generator according to some exemplary embodiments. FIG. 38 is a cross-sectional view of a vibration generator according to some exemplary embodiments. FIGS. 39 and 40 are views showing a method of vibrating a display panel according to some exemplary embodiments. The exemplary embodiments of FIGS. 36 to 40 are different from the exemplary embodiment of FIG. 9 in that a vibration generator 510_5 includes a vibration generating layer 510a and a magnetic layer 510b. A description overlapping that of the exemplary embodiment of FIG. 9 will be omitted, and differences will be mainly described.

Referring to FIGS. 36 to 38, in some exemplary embodiments, a vibration generator 510_5 includes a vibration generating layer 510a and a magnetic layer 510b. The vibration generating layer 510a may be a piezoelectric element or piezoelectric actuator that can vibrate the display panel 300 using a piezoelectric material contracting and expanding according to the applied voltage.

In some exemplary embodiments, the magnetic layer 510b of the vibration generator 510_5 may be disposed on the lower surface 542 of the vibration generating layer 510a. For instance, the magnetic layer 510b may be disposed on the entire lower surface 542 of the vibration generating layer 510a, but some exemplary embodiments are not limited thereto. The magnetic layer 510b may be disposed on a part of the lower surface 542 of the vibration generating layer 510a. For example, the magnetic layer 510b may be disposed only on the lower surface 542 of the vibration generating layer 510a overlapping a magnet MS in the third direction (Z-axis direction).

The magnetic layer 510b may include a first planar coil portion CP1 and a second planar coil portion CP2. For example, the second plane coil portion CP2 may be disposed on the lower surface 542 of the vibration generating layer 510a, and the first planar coil portion CP1 may be disposed on the lower surface of the second planar coil portion CP2. The first planar coil portion CP1 may overlap the second planar coil portion CP2 in the third direction (Z-axis direction).

The first planar coil portion CP1 and the second planar coil portion CP2 may be connected to each other through a connection pattern CNT at a central portion thereof. For instance, when the first planar coil portion CP1 and the second planar coil portion CP2 are disposed so as to overlap the magnetic layer 510a in the third direction, a stronger magnetic field can be generated, compared to when the first planar coil portion CP1 and the second planar coil portion CP2 are separately formed.

One end of the magnetic layer 510b may be electrically connected to the first electrode 512_1 of the vibration generator 510_5, and the other end of the magnetic layer 510b may be electrically connected to the second electrode 513_1 of the vibration generator 510_5.

Referring to FIG. 39, when the vibration generating layer 510a contracts to transmit a force to the display panel 300 in a direction opposite to the third direction (Z-axis direction), a current I(in) may be applied to one end of the magnetic layer 510b connected to the first electrode 512_1 of the vibration generating layer 510a, and thus the magnetic layer 510b may be switched to a first polar state in which the upper portion of the magnetic layer 510b is an N pole and the lower portion thereof is an S pole. For instance, an attractive force AF may be generated between the first magnet MS1 and the magnetic layer 510b of the vibration generator 510_5 to increase a force transmitted to the display panel 300 in a direction opposite to the third direction (Z-axis direction).

Referring to FIG. 40, when the vibration generating layer 510a contracts to transmit a force to the display panel 300 in the third direction (Z-axis direction), a current I(in) may be applied to the other end of the magnetic layer 510b connected to the first electrode 512_1 of the vibration generating layer 510a, and thus the magnetic layer 510b may be switched to a second polar state in which the upper portion of the magnetic layer 510b is an S pole and the lower portion thereof is an N pole. In this case, a repulsive force RF may be generated between the first magnet MS1 and the magnetic layer 510b of the vibration generator 510_5 to increase a force transmitted to the display panel 300 in the third direction (Z-axis direction).

As described above, in the vibration generator 510_5, when the polarity of the magnetic layer 510b is switched in accordance with the contraction and expansion of the vibration generating layer 510a, the vibration of the vibration generator 510_5 may be effectively transmitted to the display panel 300 to improve the sound output of the display device 10.

According to a display device of some exemplary embodiments, a vibration generator for vibrating a display panel to output a sound may be disposed on one surface of the display panel. Thus, it is possible to output a sound using the display panel as a vibration surface by using the vibration generator not exposed to the outside. For instance, since a speaker for outputting the voice of the display device may be omitted, the light transmitting area of a cover window can be enlarged, and thus an area where an image is displayed by the display panel can be enlarged. For instance, because vibration may be transmitted to the display panel through a magnet having a smaller area than the vibration generator, the display panel can be effectively vibrated by reducing a vibration surface, and a low-frequency band can be reinforced. Moreover, it is possible to increase the vibration transmitted from the vibration generator to the display panel by using the magnetic field of the magnet.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display device, comprising:
a display panel including a pixel array layer;
a panel lower member disposed under the display panel;
a first magnet disposed under the panel lower member and having a first area;
a vibration generator coupled to one surface of the first magnet and having a second area larger than the first area; and
a second magnet overlapping the first magnet in a thickness direction and spaced apart from the first magnet in the thickness direction,
wherein a surface of the first magnet is coupled to a lower surface of the panel lower member, and the vibration generator comprises a fixed portion overlapping the first magnet in the thickness direction and a cantilever portion not overlapping the first magnet in the thickness direction.

2. The display device of claim 1, wherein the second magnet is spaced apart from the vibration generator in the thickness direction.

3. The display device of claim 2, further comprising a middle frame disposed under the panel lower member,
wherein a first surface of the vibration generator is coupled to the middle frame, a first surface of the first magnet is coupled to a second surface of the vibration generator, and the second magnet is coupled to a first surface of the panel lower member.

4. The display device of claim 3, wherein one side surface of the first magnet, one side surface of the vibration generator, and one side surface of the second magnet are aligned in the thickness direction; and the first and second surfaces of the vibration generator comprise, respectively, a lower surface and an upper surface, and the first surface of the first magnet comprises a lower surface.

5. The display device of claim 2, wherein an attractive force or a repulsive force is generated between the first magnet and the second magnet.

6. The display device of claim 2, wherein at least one of the first magnet and the second magnet comprises a planar coil portion wherein polarity is switched with a direction of an applied current.

7. The display device of claim 6, wherein the planar coil portion further comprises a low pass filter applying a current to the planar coil portion only in a low-frequency signal corresponding to a low-pitched sound among electrical voice signals.

8. The display device of claim 2, wherein at least one of the first magnet and the second magnet comprises a Halbach array.

9. The display device of claim 2, further comprising:
a middle frame disposed under the vibration generator; and
a first support portion and a second support portion disposed on the middle frame.

10. The display device of claim 9, wherein the vibration generator comprises a first fixed portion overlapping the first magnet in the thickness direction, a second fixed portion overlapping the first support portion in the thickness direction, and a third fixed portion overlapping the second support portion in the thickness direction.

11. The display device of claim 10, wherein the vibration generator further comprises:
a first cantilever portion disposed between the first fixed portion and the second fixed portion, and
a second cantilever portion between the first fixed portion and the third fixed portion.

12. The display device of claim 10, wherein the second magnet is attached and coupled to the middle frame, and the second magnet is spaced apart from the first support portion and the second support portion.

13. The display device of claim 12, further comprises a film layer disposed between the panel lower member and the first magnet, wherein the first magnet is coupled to a lower surface of the film layer.

14. The display device of claim 13, wherein the film layer and the panel lower member are spaced apart from each other in the thickness direction.

15. The display device of claim 14, further comprises an adhesive portion disposed between the film layer and the panel lower member,
wherein the adhesive portion is disposed to surround an edge of the film layer, and the adhesive portion comprises a sound hole to generate a sound by vibration of the film layer to the outside.

16. The display device of claim 1, wherein the cantilever portion comprises a first cantilever portion coupled to one end of the fixed portion, and a second cantilever portion coupled to another end of the fixed portion.

17. The display device of claim 16, further comprising a support layer disposed between the first cantilever portion and the panel lower member.

18. The display device of claim 1, wherein one side surface of the first magnet, one side surface of the vibration generator, and one side surface of the second magnet are aligned in the thickness direction.

19. The display device of claim 18, further comprising a support layer disposed between the cantilever portion and the panel lower member.

20. A display device, comprising:
a display panel including a pixel array layer;
a panel lower member disposed under the display panel;
a first magnet disposed under the panel lower member and having a first area;
a vibration generator coupled to one surface of the first magnet and having a second area larger than the first area; and
a second magnet overlapping the first magnet in a thickness direction and spaced apart from the first magnet in the thickness direction,
wherein the second magnet is spaced apart from the vibration generator in the thickness direction, and
wherein a first surface of the vibration generator is in contact with a surface of the first magnet, a second surface of the vibration generator is coupled to a first surface of the panel lower member, and another surface of the first magnet faces a surface of the second magnet.

21. The display device of claim 20, wherein one side surface of the first magnet, one side surface of the vibration generator, and one side surface of the second magnet are aligned in the thickness direction; and the first and second surfaces of the vibration generator comprise, respectively, a lower surface and an upper surface, the first surface of the panel lower member comprises a lower surface, the another surface and a surface of the first magnet, comprise, respectively, a lower surface and an upper surface, and a surface of the second magnet comprises an upper surface.

22. A display device, comprising:
a display panel including a pixel array layer;
a panel lower member disposed under the display panel;
a magnet disposed under the panel lower member and having a first area; and
a vibration generator coupled to one surface of the magnet and having a second area larger than the first area,
wherein the vibration generator comprises a magnetic layer including a planar coil portion and polarity switchable with an applied current, and a vibration generating layer disposed between the magnetic layer and the magnet.

23. The display device of claim 22, wherein the vibration generating layer comprises a piezoelectric element, in turn, comprising a first electrode, a second electrode, and a vibration layer, and
one end of the planar coil portion is electrically connected to the first electrode, and an other end of the planar coil portion is electrically connected to the second electrode.

24. The display device of claim 23, wherein the panel lower member comprises an accommodation hole, and the magnet is inserted into the accommodation hole.

25. The display device of claim 24, wherein, when the vibration generating layer contracts, an attractive force is generated between the magnet and the magnetic layer.

26. The display device of claim 25, wherein, when the vibration generating layer expands, a repulsive force is generated between the magnet and the magnetic layer.

27. The display device of claim 25, wherein the vibration generator comprises a fixed portion overlapping the magnet in a thickness direction, and a cantilever portion not overlapping the magnet in the thickness direction.

\* \* \* \* \*